(12) United States Patent
Choi et al.

(10) Patent No.: US 11,698,530 B2
(45) Date of Patent: Jul. 11, 2023

(54) SWITCH LEAKAGE COMPENSATION FOR GLOBAL ILLUMINATION

(71) Applicant: Meta Platforms Technologies, LLC, Menlo Park, CA (US)

(72) Inventors: Min Hyuk Choi, San Jose, CA (US); Zhiming Zhuang, Sammamish, WA (US); Wonjae Choi, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/027,521

(22) Filed: Sep. 21, 2020

(65) Prior Publication Data

US 2022/0091418 A1 Mar. 24, 2022

(51) Int. Cl.
*G02B 27/01* (2006.01)
*G02B 27/00* (2006.01)
*G06F 3/01* (2006.01)
*G09G 3/3233* (2016.01)

(52) U.S. Cl.
CPC ..... *G02B 27/0172* (2013.01); *G02B 27/0093* (2013.01); *G06F 3/013* (2013.01); *G06F 3/015* (2013.01); *G09G 3/3233* (2013.01); *G02B 2027/014* (2013.01); *G02B 2027/0187* (2013.01)

(58) Field of Classification Search
CPC ............ G02B 27/0093; G02B 27/0172; G02B 2027/014; G02B 2027/0187; G06F 3/011; G06F 3/012; G06F 3/013; G06F 3/015; G09G 3/30; G09G 3/32; G09G 3/3208; G09G 3/3233
USPC .......................................................... 345/8
See application file for complete search history.

(56) References Cited

U.S. PATENT DOCUMENTS

| 5,471,542 | A | * | 11/1995 | Ragland | ................ | A61B 3/113 351/208 |
|---|---|---|---|---|---|---|
| 2013/0181969 | A1 | * | 7/2013 | Kishi | .................... | G09G 3/3275 345/212 |
| 2014/0285533 | A1 | | 9/2014 | Chun et al. | | |
| 2020/0126292 | A1 | | 4/2020 | Yeoh et al. | | |
| 2020/0143742 | A1 | | 5/2020 | Park et al. | | |
| 2020/0348750 | A1 | * | 11/2020 | Selan | .................... | G09G 3/3208 |
| 2021/0335256 | A1 | * | 10/2021 | Yin | ....................... | G09G 3/3258 |
| 2021/0343246 | A1 | * | 11/2021 | Yin | ....................... | G09G 3/3291 |

OTHER PUBLICATIONS

"Asynchronous TimeWarp (ATW)," Oculus Developers, [Retrieved on Nov. 16, 2021], 4 pages, Retrieved from the Internet: https://developer.oculus.com/documentation/native/android/mobile-timewarp-overview/.

International Search Report and Written Opinion for International Application No. PCT/US2021/051067, dated Nov. 19, 2021, 15 pages.

\* cited by examiner

*Primary Examiner* — Jason M Mandeville
(74) *Attorney, Agent, or Firm* — Weaver Austin Villeneuve & Sampson LLP

(57) ABSTRACT

A method of leakage-compensated global illumination comprises obtaining position data for at least one of a head or an eye of a user of a display system by an application processor, rendering image data for an image frame by the application processor based on the position data, modifying the image data to compensate for leakage associated with a global illumination by a display of the display system, and sending the image data to a display driver circuit of the display system for displaying the image frame on the display through the global illumination.

18 Claims, 18 Drawing Sheets

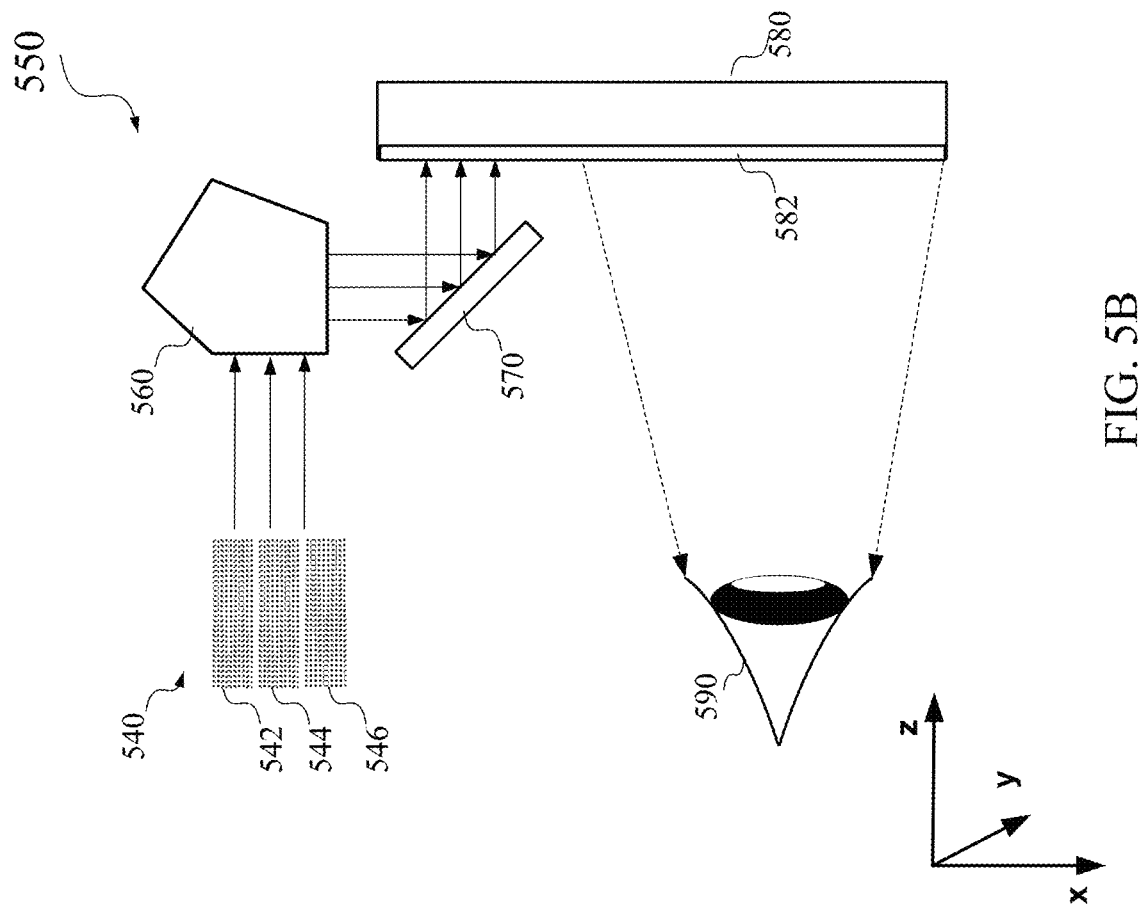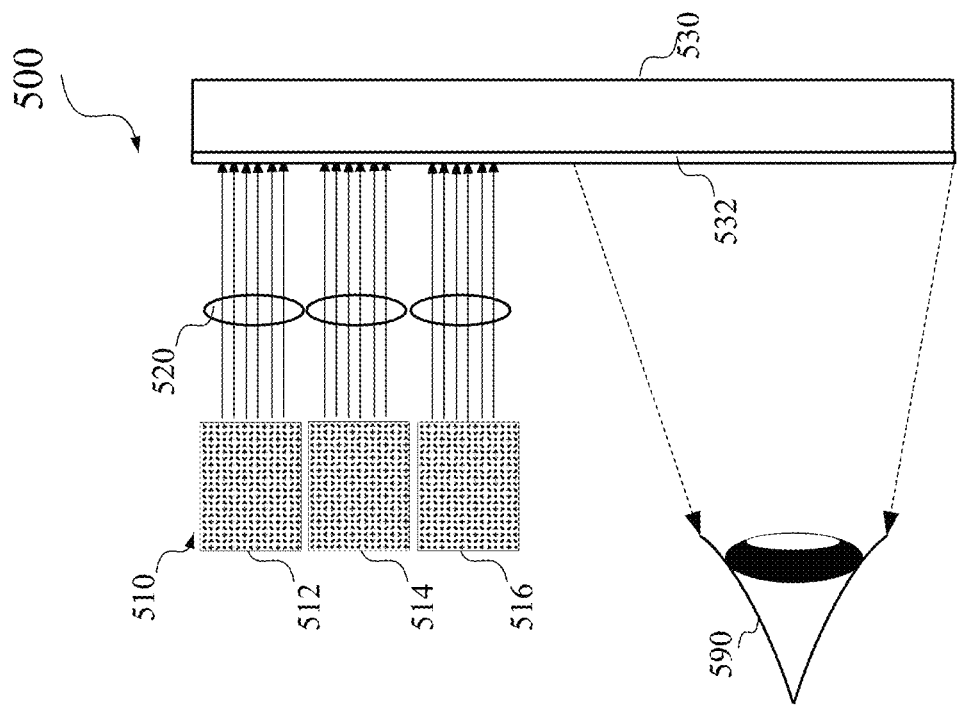
FIG. 5B
FIG. 5A

SWITCH LEAKAGE COMPENSATION FOR GLOBAL ILLUMINATION

BACKGROUND

An artificial reality system, such as a head-mounted display (HMD) or heads-up display (HUD) system, generally includes a near-eye display system in the form of a headset or a pair of glasses. The artificial reality system may be configured to present content to a user via an electronic or optic display within, for example, about 10-20 mm in front of the user's eyes. The near-eye display system may display virtual objects or combine images of real objects with virtual objects, as in virtual reality (VR), augmented reality (AR), or mixed reality (MR) applications. For example, in an AR system, a user may view images of virtual objects (e.g., computer-generated images (CGIs)) and the surrounding environment, for example, by seeing through transparent display glasses or lenses or viewing displayed images of the surrounding environment captured by a camera. The near-eye display system may include one or more light sources that are driven to output light at various luminance levels to display the images.

SUMMARY

This disclosure relates generally to display systems. According to certain embodiments, a method may include obtaining position data for at least one of a head or an eye of a user of a display system by an application processor, rendering image data for an image frame by the application processor based on the position data, modifying the image data to compensate for leakage associated with a global illumination by a display of the display system, and sending the image data to a display driver circuit of the display system for displaying the image frame on the display through the global illumination.

In some embodiments, the method may also include, before modifying the image data, re-projecting the image data rendered by the application processor based on updated position data. For example, the method may include, before modifying the image data, estimating a position of at least one of the head or the eye of the user at a time of the global illumination, and re-projecting the image data rendered by the application processor based on the estimated position of at least one of the head or the eye of the user. In another example, the method may include, before modifying the image data, obtaining a new position of at least one of the head or the eye of the user at a time after the image data is rendered, and re-projecting the image data rendered by the application processor based on the new position of at least one of the head or the eye of the user.

In some embodiments, the method may include estimating, based on the position data, a position of at least one of the head or the eye of the user at a time of the global illumination, where rendering the image data by the application processor may include rendering the image data based on the estimated position of at least one of the head or the eye of the user at the time of the global illumination. In some embodiments, the method may include loading the image data into pixel driving circuits of the display, and turning on pixels of the display by the display driver circuit for the global illumination.

In some embodiments, obtaining the position data for at least one of the head or the eye of the user may include receiving the position data from at least one of a head-tracking sensor or an eye-tracking sensor. In some embodiments, rendering the image data for the image frame may include executing an application based on the position data to determine a scene for the eye of the user, and converting the scene for the eye of the user to drawing commands.

In some embodiments, modifying the image data to compensate for the leakage associated with the global illumination by the display may include, for each row of pixels of the display, determining a leakage current in a driving circuit for a light source in a pixel of the row of pixels, determining a time delay between loading the image data for the row of pixels into the row of pixels and the global illumination, determining, based on the leakage current and the time delay, a leakage compensation value for the light source in the pixel, and adjusting the image data for the light source of the pixel based on the leakage compensation value.

According to certain embodiments, a display system may include a display including a plurality of light sources and corresponding light source driving circuits, where the plurality of light sources is arranged in a plurality of rows. The display system may also include a display driver circuit coupled to the display, and an application processor coupled to the display driver circuit. The application processor may be configured to obtain position data for at least one of a head or an eye of a user of the display system, render image data for an image frame based on the position data, modify the image data to compensate for leakage associated with a global illumination by the display, and send the image data to the display driver circuit for displaying the image frame on the display through the global illumination.

In some embodiments of the display system, the application processor may be configured to, before modifying the image data, re-project the image data based on updated position data. In some embodiments, the application processor may be configured to, before modifying the image data, estimate a position of at least one of the head or the eye of the user at a time of the global illumination, and re-project the image data based on the estimated position of at least one of the head or the eye of the user. In some embodiments, the application processor may be configured to, before modifying the image data, obtain a new position of at least one of the head or the eye of the user at a time after the image data is rendered, and re-project the image data based on the new position of at least one of the head or the eye of the user. In some embodiments, the application processor may be configured to estimate, based on the position data, a position of at least one of the head or the eye of the user at a time of the global illumination, and render the image data based on the estimated position of at least one of the head or the eye of the user.

In some embodiments, the application processor may be configured to modify the image data to compensate for the leakage associated with the global illumination by, for each row of the plurality of rows, determining a leakage current in a light source driving circuit for a light source in the row, determining a time delay between loading the image data for the light source into the corresponding light source driving circuit and the global illumination, determining a leakage compensation value for the light source based on the leakage current and the time delay, and adjusting the image data for the light source based on the leakage compensation value. In some embodiments, the application processor may be configured to render the image data for the image frame by executing an application based on the position data to determine a scene for the eye of the user and converting the scene for the eye of the user to drawing commands.

In some embodiments, the display driver circuit may be configured to load the image data into the light source driving circuits for the plurality of light sources and control the light source driving circuits to turn on the plurality of light sources for the global illumination. The application processor may include at least one of a central processing unit or a graphic processing unit. The plurality of light sources includes an array of organic light emitting diodes (OLEDs) or an array of micro-light emitting diodes (micro-LEDs).

According to certain embodiments, a non-transitory machine-readable storage medium may include instructions stored thereon. The instructions, when executed by one or more processors, may cause the one or more processors to perform operations including obtaining position data for at least one of a head or an eye of a user of a display system, rendering image data for an image frame based on the position data, modifying the image data to compensate for leakage associated with a global illumination by a display of the display system, and sending the image data to a display driver circuit of the display system for displaying the image frame on the display through the global illumination.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 5A illustrates an example of a near-eye display device including a waveguide display according to certain embodiments.

FIG. 5B illustrates an example of a near-eye display device including a waveguide display according to certain embodiments.

Figure 1:
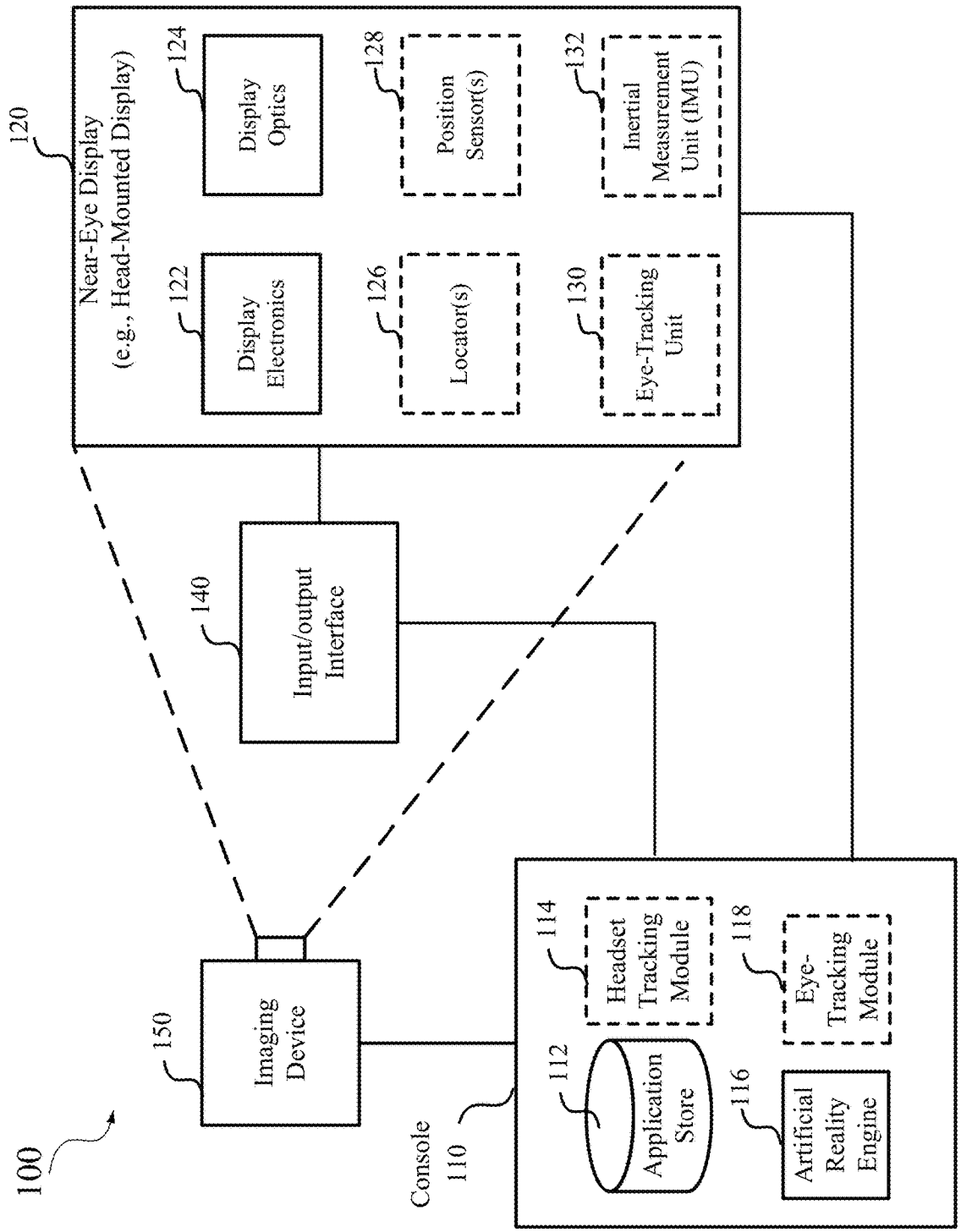
FIG. 1 is a simplified block diagram of an example of an artificial reality system environment including a near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques disclosed herein relate generally to display systems. More specifically, and without limitation, disclosed herein are techniques for displaying images using leakage-compensated global illumination, for example, in artificial reality applications. Techniques disclosed herein can reduce the computation complexity for image rendering, while reducing the luminance non-uniformity and color shift in near-eye display systems, such as virtual reality (VR), augmented reality (AR), or mixed reality (MR) display systems. Various inventive embodiments are described herein, including systems, modules, circuits, devices, methods, instructions, code, machine-readable media, and the like.

In an artificial reality display system, such as a VR, AR, or MR display system, the orientation and/or location (collectively referred to as position or pose) of a user's head or eye may be tracked, images may then be rendered based on the position of a user's head or eye for displaying by a display panel that includes a two-dimensional array of pixels, such as an active matrix organic light emitting diode (AMOLED) array or a micro-light emitting diode (micro-LED or μLED) array. Because the image rendering time may be relatively long, the position of the user's head or eye after the rendering time or at the illumination time may have changed from the position before image rendering. As such, the displayed images may have judder or motion-to-photon latency (the time needed for a user movement to be fully reflected on a display screen). In order to reduce the judder and latency and/or to increase the frame rate (e.g., for gaming), re-projection (e.g., timewarping) techniques may be used to shift the rendered image slightly to adjust for changes in head or eye movement.

Many VR/AR/MR display systems operate using rolling illumination techniques, where each row of pixels in the two-dimensional array of pixels may emit light during a different (e.g., staggered) respective time period. In rolling illumination, the hold time from data writing to light emission may be the same for all rows of pixels. Therefore, any leakage during the hold time may not cause non-uniformity in the displayed image. However, for rolling illumination, a different respective prediction (or measurement) of the head/eye position and image rendering (or only re-projection) may need to be performed for each row of pixels because of the different emission time of the different rows with respect to the beginning of a frame. Thus, a high computation power or long computation time may be needed for the image rendering (including re-projection, such as timewarping). In global illumination where pixels in different rows emit at the same time, a common prediction (or measurement) of the head/eye position and image rendering (or re-projection) may be performed for all rows of pixels in each frame. Thus, the computation complexity for image rendering is much lower. However, in global illumination, image data is written to different rows of pixels at different times and the different rows of pixels emit at the same time. Therefore, the image data for different rows of pixels may be held at the pixels for different periods of time. As such, the leakage of the display data may be different for different rows of pixel, which may cause non-uniformity and/or color shift in the displayed images.

According to certain embodiments, display data for different rows of pixels of a display system may be pre-compensated by different values based on predicted or pre-determined leakage currents and different hold time periods. The rows of pixels may emit at the same time for global illumination. Because of the global illumination, a common prediction of the head/eye position and a common image rendering or re-projection may be performed for all pixels of each image frame, rather than for each row of pixels, thereby reducing the computation complexity and computation time. Because of the lower computation complexity and shorter computation time for image rendering (including re-projection such as timewarping), the motion-to-photon latency can be reduced and/or the frame rate of the displayed image frames (e.g., for a video or a game) can be increased. In addition, the image data at the pixels can be at the desired values right before the global illumination even if the image data may leak by different values for different rows of pixels after the sequential image data loading. Thus, techniques disclosed herein can also reduce the non-uniformity and/or color shifting associated with global illumination, thereby improving the image and video quality for global illumination in VR/AR/MR systems.

As used herein, the term "organic light emitting diode" ("OLED") refers to a light emitting diode having an emissive electroluminescent layer that includes an organic compound that emits light in response to an electric current. The emissive layer may be arranged between an anode and a cathode. The organic compound may include small molecules or polymers.

As used herein, the term "active matrix organic light emitting diode" or "AMOLED" display refers to a display that uses a thin-film transistor backplane to directly control each individual pixel. An AMOLED display does not use a backlight, because each individual OLED is self-emissive. The amount of luminance provided by each OLED depends on the current provided to the OLED.

As used herein, the term "micro-LED" or "μLED" refers to an LED that has a chip where a linear dimension of the chip is less than about 200 μm, such as less than 100 μm, less than 50 μm, less than 20 μm, less than 10 μm, or smaller. For example, the linear dimension of a micro-LED may be as small as 6 μm, 5 μm, 4 μm, 2 μm, or smaller. Some micro-LEDs may have a linear dimension (e.g., length or diameter) comparable to the minority carrier diffusion length. However, the disclosure herein is not limited to micro-LEDs, and may also be applied to mini-LEDs and large LEDs.

As used herein, the term "luminance" refers generally to a photometric measure of the luminous intensity per unit area of light travelling in a certain direction. Luminance describes the amount of light that is emitted from, passing through, or reflected from an area and falls within a certain solid angle. The luminance level indicates how much luminous power could be detected by a sensor (e.g., the human eye) looking at a surface from a certain angle of view. Luminance may be an indicator of how bright a surface may appear. The international standard unit for luminance is candela per square meter ($cd/m^2$). Luminance is used in the video industry to characterize the brightness of displays. The term "brightness" refers generally to the perception elicited by the luminance of an object. A given target luminance may elicit different perceptions of brightness in different contexts. In an RGB color space, brightness can be determined based on the red, green, and blue color coordinates In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (μLED) display, an active-matrix OLED display (AMO-LED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be an LED, a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and an eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random-access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or any combination thereof, to predict a future location of near-eye display 120. Headset tracking module 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to more accurately determine the eye's orientation.

In some embodiments, eye-tracking module 118 may store a mapping between images captured by eye-tracking unit 130 and eye positions to determine a reference eye position from an image captured by eye-tracking unit 130. Alternatively or additionally, eye-tracking module 118 may determine an updated eye position relative to a reference eye position by comparing an image from which the reference eye position is determined to an image from which the updated eye position is to be determined. Eye-tracking module 118 may determine eye position using measurements from different imaging devices or other sensors. For example, eye-tracking module 118 may use measurements from a slow eye-tracking system to determine a reference eye position, and then determine updated positions relative to the reference eye position from a fast eye-tracking system until a next reference eye position is determined based on measurements from the slow eye-tracking system.

Eye-tracking module 118 may also determine eye calibration parameters to improve precision and accuracy of eye tracking. Eye calibration parameters may include parameters that may change whenever a user dons or adjusts near-eye display 120. Example eye calibration parameters may include an estimated distance between a component of eye-tracking unit 130 and one or more parts of the eye, such as the eye's center, pupil, cornea boundary, or a point on the surface of the eye. Other example eye calibration parameters may be specific to a user and may include an estimated average eye radius, an average corneal radius, an average sclera radius, a map of features on the eye surface, and an estimated eye surface contour. In embodiments where light from the outside of near-eye display 120 may reach the eye (as in some augmented reality applications), the calibration parameters may include correction factors for intensity and color balance due to variations in light from the outside of near-eye display 120. Eye-tracking module 118 may use eye calibration parameters to determine whether the measurements captured by eye-tracking unit 130 would allow eye-tracking module 118 to determine an accurate eye position (also referred to herein as "valid measurements"). Invalid measurements, from which eye-tracking module 118 may not be able to determine an accurate eye position, may be caused by the user blinking, adjusting the headset, or removing the headset, and/or may be caused by near-eye display 120 experiencing greater than a threshold change in illumination due to external light. In some embodiments, at least some of the functions of eye-tracking module 118 may be performed by eye-tracking unit 130.

Figure 2:
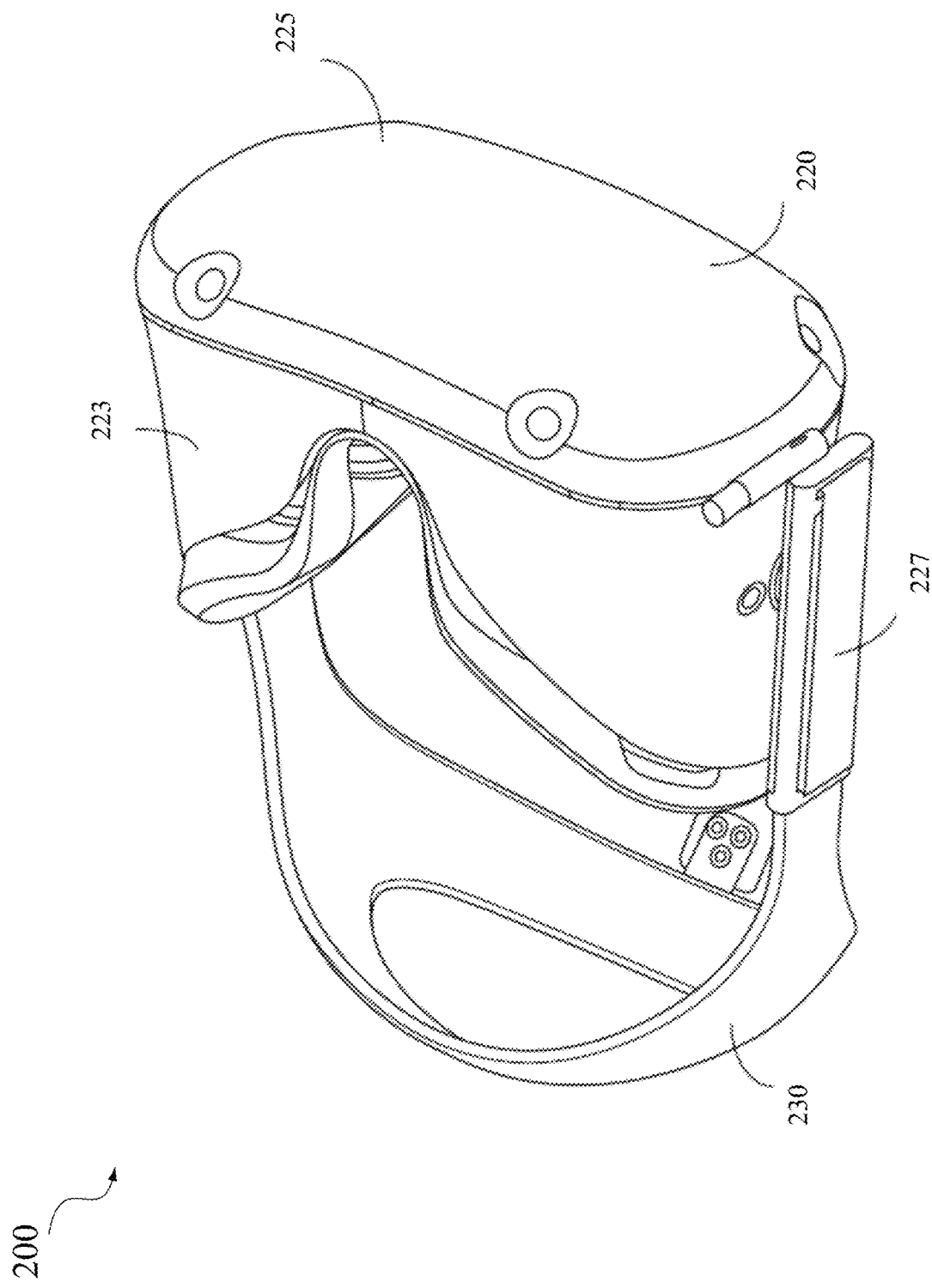
FIG. 2 is a perspective view of an example of a near-eye display in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a µLED display, an AMOLED, a TOLED, some other display, or any combination thereof. HMD device 200 may include two eye box regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
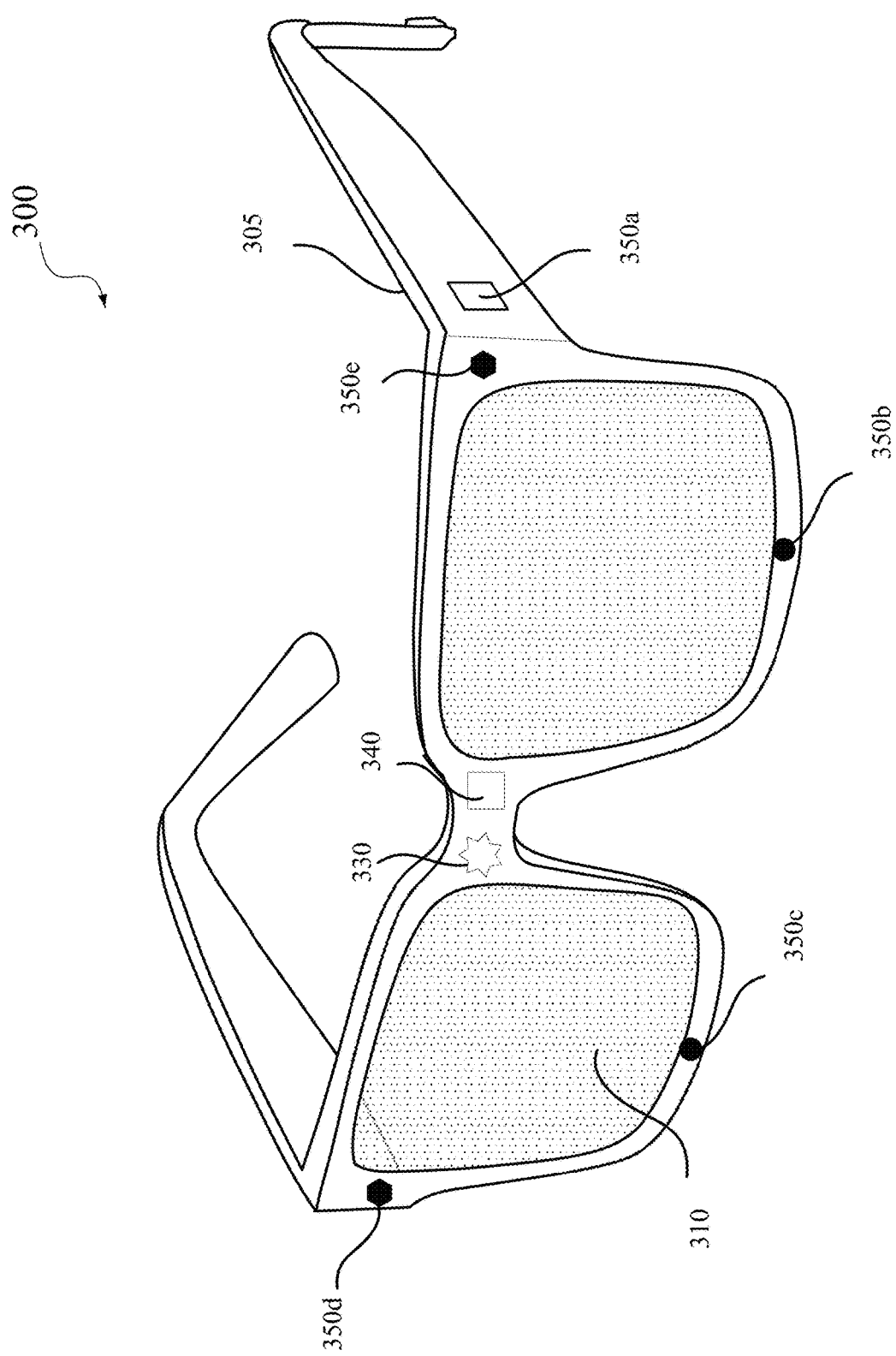
FIG. 3 is a perspective view of an example of a near-eye display in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light patterns onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
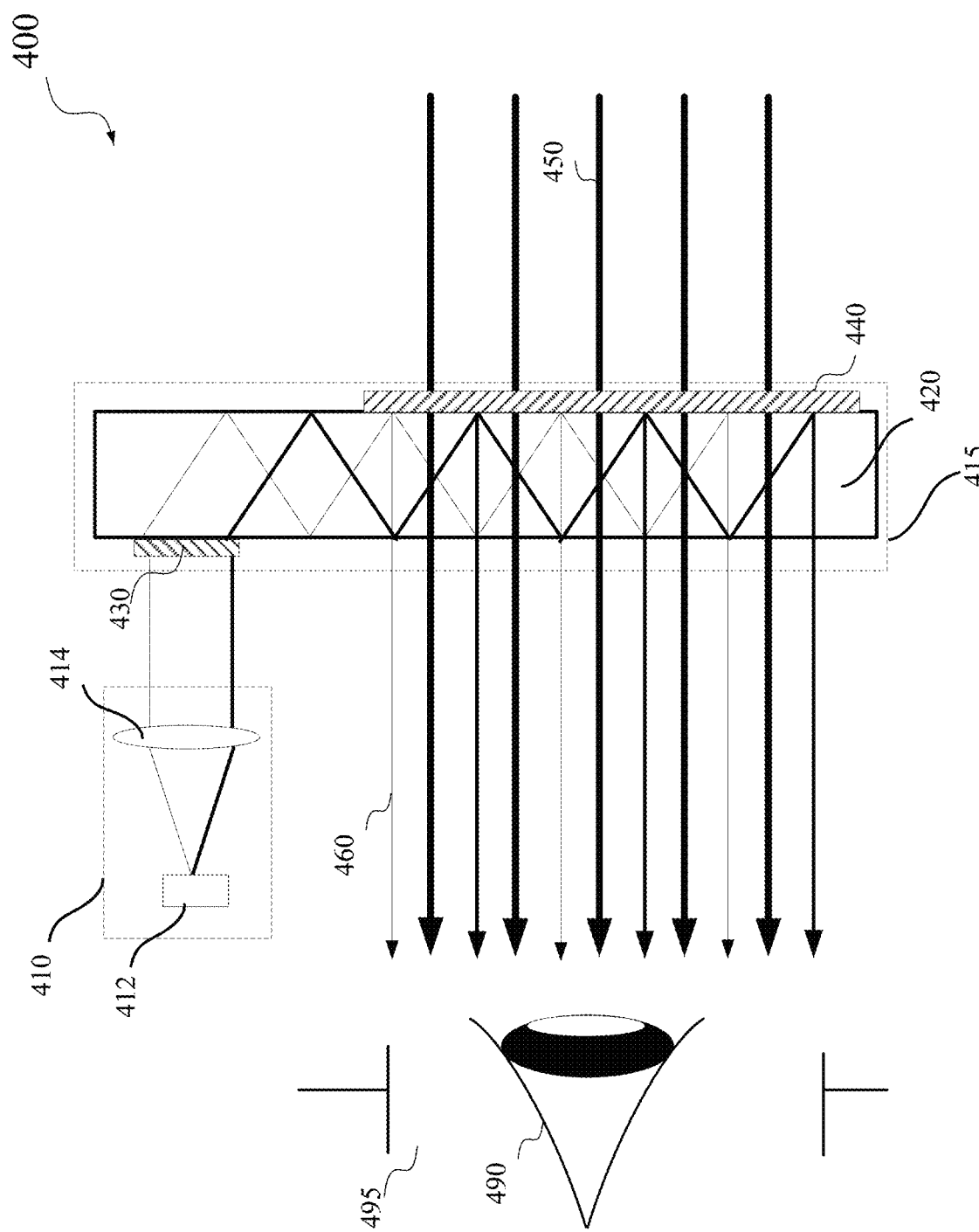
FIG. 4 illustrates an example of an optical see-through augmented reality system including a waveguide display according to certain embodiments.

FIG. 4 illustrates an example of an optical see-through augmented reality system 400 including a waveguide display according to certain embodiments. Augmented reality system 400 may include a projector 410 and a combiner 415. Projector 410 may include a light source or image source 412 and projector optics 414. In some embodiments, light source or image source 412 may include one or more micro-LED devices described above. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, an LED, and/or a micro-LED described above. In some embodiments, image source 412 may include a plurality of light sources (e.g., an array of micro-LEDs described above), each emitting a monochromatic image light corresponding to a primary color (e.g., red, green, or blue). In some embodiments, image source 412 may include three two-dimensional arrays of micro-LEDs, where each two-dimensional array of micro-LEDs may include micro-LEDs configured to emit light of a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. For example, in some embodiments, image source 412 may include one or more one-dimensional arrays or elongated two-dimensional arrays of micro-LEDs, and projector optics 414 may include one or more one-dimensional scanners (e.g., micro-mirrors or prisms) configured to scan the one-dimensional arrays or elongated two-dimensional arrays of micro-LEDs to generate image frames. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Combiner 415 may transmit at least 50% of light in a first wavelength range and reflect at least 25% of light in a second wavelength range. For example, the first wavelength range may be visible light from about 400 nm to about 650 nm, and the second wavelength range may be in the infrared band, for example, from about 800 nm to about 1000 nm. Input coupler 430 may include a volume holographic grating, a diffractive optical element (DOE) (e.g., a surface-relief grating), a slanted surface of substrate 420, or a refractive coupler (e.g., a wedge or a prism). For example, input coupler 430 may include a reflective volume Bragg grating or a transmissive volume Bragg grating. Input coupler 430 may have a coupling efficiency of greater than 30%, 50%, 75%, 90%, or higher for visible light. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 420 may be transparent to visible light.

Substrate 420 may include or may be coupled to a plurality of output couplers 440, each configured to extract at least a portion of the light guided by and propagating within substrate 420 from substrate 420, and direct extracted light 460 to an eyebox 495 where an eye 490 of the user of augmented reality system 400 may be located when augmented reality system 400 is in use. The plurality of output couplers 440 may replicate the exit pupil to increase the size of eyebox 495 such that the displayed image is visible in a larger area. As input coupler 430, output couplers 440 may include grating couplers (e.g., volume holographic gratings or surface-relief gratings), other diffraction optical elements (DOEs), prisms, etc. For example, output couplers 440 may include reflective volume Bragg gratings or transmissive volume Bragg gratings. Output couplers 440 may have different coupling (e.g., diffraction) efficiencies at different locations. Substrate 420 may also allow light 450 from the environment in front of combiner 415 to pass through with little or no loss. Output couplers 440 may also allow light 450 to pass through with little loss. For example, in some implementations, output couplers 440 may have a very low diffraction efficiency for light 450 such that light 450 may be refracted or otherwise pass through output couplers 440 with little loss, and thus may have a higher intensity than extracted light 460. In some implementations, output couplers 440 may have a high diffraction efficiency for light 450 and may diffract light 450 in certain desired directions (i.e., diffraction angles) with little loss. As a result, the user may be able to view combined images of the environment in front of combiner 415 and images of virtual objects projected by projector 410.

FIG. 5A illustrates an example of a near-eye display (NED) device 500 including a waveguide display 530 according to certain embodiments. NED device 500 may be an example of near-eye display 120, augmented reality system 400, or another type of display device. NED device 500 may include a light source 510, projection optics 520, and waveguide display 530. Light source 510 may include multiple panels of light emitters for different colors, such as a panel of red-light emitters 512, a panel of green light emitters 514, and a panel of blue light emitters 516. The red-light emitters 512 are organized into an array; the green light emitters 514 are organized into an array; and the blue light emitters 516 are organized into an array. The dimensions and pitches of light emitters in light source 510 may be small. For example, each light emitter may have a diameter less than 2 μm (e.g., about 1.2 μm) and the pitch may be less than 2 μm (e.g., about 1.5 μm). As such, the number of light emitters in each red light emitters 512, green light emitters 514, and blue light emitters 516 can be equal to or greater than the number of pixels in a display image, such as 960×720, 1280×720, 1440×1080, 1920×1080, 2160×1080, or 2560×1080 pixels. Thus, a display image may be generated simultaneously by light source 510. A scanning element may not be used in NED device 500.

Before reaching waveguide display 530, the light emitted by light source 510 may be conditioned by projection optics 520, which may include a lens array. Projection optics 520 may collimate or focus the light emitted by light source 510 to waveguide display 530, which may include a coupler 532 for coupling the light emitted by light source 510 into waveguide display 530. The light coupled into waveguide display 530 may propagate within waveguide display 530 through, for example, total internal reflection as described above with respect to FIG. 4. Coupler 532 may also couple portions of the light propagating within waveguide display 530 out of waveguide display 530 and towards user's eye 590.

FIG. 5B illustrates an example of a near-eye display (NED) device 550 including a waveguide display 580 according to certain embodiments. In some embodiments, NED device 550 may use a scanning mirror 570 to project light from a light source 540 to an image field where a user's eye 590 may be located. NED device 550 may be an example of near-eye display 120, augmented reality system 400, or another type of display device. Light source 540 may include one or more rows or one or more columns of light emitters of different colors, such as multiple rows of red-light emitters 542, multiple rows of green light emitters 544, and multiple rows of blue light emitters 546. For example, red light emitters 542, green light emitters 544, and blue light emitters 546 may each include N rows, each row including, for example, 2560 light emitters (pixels). The red-light emitters 542 are organized into an array; the green light emitters 544 are organized into an array; and the blue light emitters 546 are organized into an array. In some embodiments, light source 540 may include a single line of light emitters for each color. In some embodiments, light source 540 may include multiple columns of light emitters for each of red, green, and blue colors, where each column may include, for example, 1080 light emitters. In some embodiments, the dimensions and/or pitches of the light emitters in light source 540 may be relatively large (e.g., about 3-5 μm) and thus light source 540 may not include enough light emitters for simultaneously generating a full display image. For example, the number of light emitters for a single color may be fewer than the number of pixels (e.g., 2560×1080 pixels) in a display image. The light emitted by light source 540 may be a set of collimated or diverging beams of light.

Before reaching scanning mirror 570, the light emitted by light source 540 may be conditioned by various optical devices, such as collimating lenses or a freeform optical element 560. Freeform optical element 560 may include, for example, a multi-facet prism or another light folding element that may direct the light emitted by light source 540 towards scanning mirror 570, such as changing the propagation direction of the light emitted by light source 540 by, for example, about 90° or larger. In some embodiments, freeform optical element 560 may be rotatable to scan the light. Scanning mirror 570 and/or freeform optical element 560 may reflect and project the light emitted by light source 540 to waveguide display 580, which may include a coupler 582 for coupling the light emitted by light source 540 into waveguide display 580. The light coupled into waveguide display 580 may propagate within waveguide display 580 through, for example, total internal reflection as described above with respect to FIG. 4. Coupler 582 may also couple portions of the light propagating within waveguide display 580 out of waveguide display 580 and towards user's eye 590.

Scanning mirror 570 may include a microelectromechanical system (MEMS) mirror or any other suitable mirrors. Scanning mirror 570 may rotate to scan in one or two dimensions. As scanning mirror 570 rotates, the light emitted by light source 540 may be directed to a different area of waveguide display 580 such that a full display image may be projected onto waveguide display 580 and directed to user's eye 590 by waveguide display 580 in each scanning cycle. For example, in embodiments where light source 540 includes light emitters for all pixels in one or more rows or columns, scanning mirror 570 may be rotated in the column or row direction (e.g., x or y direction) to scan an image. In embodiments where light source 540 includes light emitters for some but not all pixels in one or more rows or columns, scanning mirror 570 may be rotated in both the row and column directions (e.g., both x and y directions) to project a display image (e.g., using a raster-type scanning pattern).

NED device 550 may operate in predefined display periods. A display period (e.g., display cycle) may refer to a duration of time in which a full image is scanned or projected. For example, a display period may be a reciprocal of the desired frame rate. In NED device 550 that includes scanning mirror 570, the display period may also be referred to as a scanning period or scanning cycle. The light generation by light source 540 may be synchronized with the rotation of scanning mirror 570. For example, each scanning cycle may include multiple scanning steps, where light source 540 may generate a different light pattern in each respective scanning step.

In each scanning cycle, as scanning mirror 570 rotates, a display image may be projected onto waveguide display 580 and user's eye 590. The actual color value and light intensity (e.g., brightness) of a given pixel location of the display image may be an average of the light beams of the three colors (e.g., red, green, and blue) illuminating the pixel location during the scanning period. After completing a scanning period, scanning mirror 570 may revert back to the initial position to project light for the first few rows of the next display image or may rotate in a reverse direction or scan pattern to project light for the next display image, where a new set of driving signals may be fed to light source 540. The same process may be repeated as scanning mirror 570 rotates in each scanning cycle. As such, different images may be projected to user's eye 590 in different scanning cycles.

Figure 6:
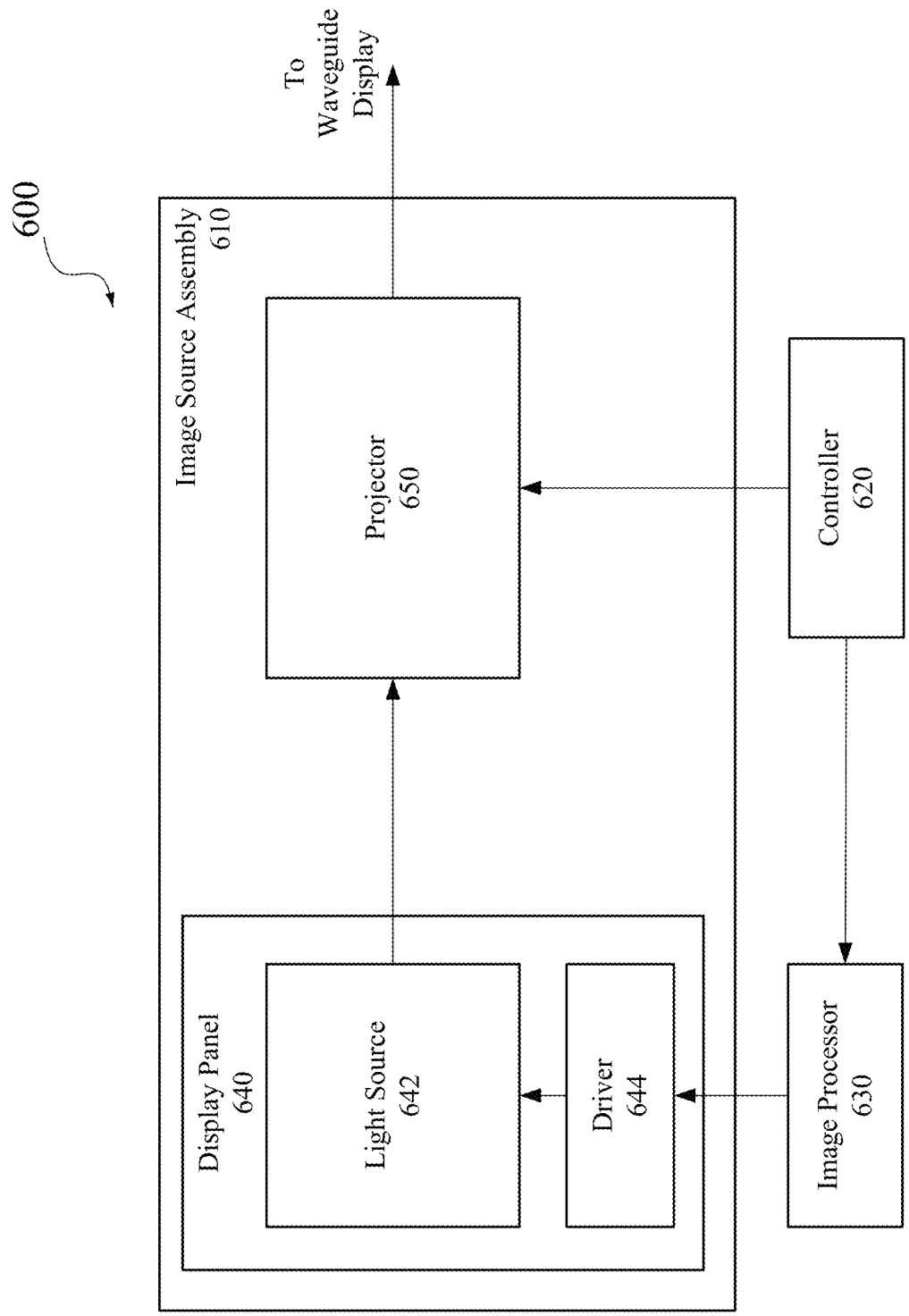
FIG. 6 illustrates an example of an image source assembly in an artificial reality system according to certain embodiments.

FIG. 6 illustrates an example of an image source assembly 610 in a near-eye display system 600 according to certain embodiments. Image source assembly 610 may include, for example, a display panel 640 that may generate display images to be projected to the user's eyes, and a projector 650 that may project the display images generated by display panel 640 to a waveguide display as described above with respect to FIGS. 4-5B. Display panel 640 may include a light source 642 and a driver circuit 644 for light source 642. Light source 642 may include, for example, light source 510 or 540. Projector 650 may include, for example, freeform optical element 560, scanning mirror 570, and/or projection optics 520 described above. Near-eye display system 600 may also include a controller 620 that synchronously controls light source 642 and projector 650 (e.g., scanning mirror 570). Image source assembly 610 may generate and output an image light to a waveguide display (not shown in FIG. 6), such as waveguide display 530 or 580. As described above, the waveguide display may receive the image light at one or more input-coupling elements and guide the received image light to one or more output-coupling elements. The input and output coupling elements may include, for example, a diffraction grating, a holographic grating, a prism, or any combination thereof. The input-coupling element may be chosen such that total internal reflection occurs with the waveguide display. The output-coupling element may couple portions of the total internally reflected image light out of the waveguide display.

As described above, light source 642 may include a plurality of light emitters arranged in an array or a matrix. Each light emitter may emit monochromatic light, such as red light, blue light, green light, infra-red light, and the like. While RGB colors are often discussed in this disclosure, embodiments described herein are not limited to using red, green, and blue as primary colors. Other colors can also be used as the primary colors of near-eye display system 600. In some embodiments, a display panel in accordance with an embodiment may use more than three primary colors. Each pixel in light source 642 may include three subpixels that include a red micro-LED, a green micro-LED, and a blue micro-LED. A semiconductor LED generally includes an active light emitting layer within multiple layers of semiconductor materials. The multiple layers of semiconductor materials may include different compound materials or a same base material with different dopants and/or different doping densities. For example, the multiple layers of semiconductor materials may include an n-type material layer, an active region that may include hetero-structures (e.g., one or more quantum wells), and a p-type material layer. The multiple layers of semiconductor materials may be grown on a surface of a substrate having a certain orientation. In some embodiments, to increase light extraction efficiency, a mesa that includes at least some of the layers of semiconductor materials may be formed.

Controller 620 may control the image rendering operations of image source assembly 610, such as the operations of light source 642 and/or projector 650. For example, controller 620 may determine instructions for image source assembly 610 to render one or more display images. The instructions may include display instructions and scanning instructions. In some embodiments, the display instructions may include an image file (e.g., a bitmap file). The display instructions may be received from, for example, a console, such as console 110 described above with respect to FIG. 1. The scanning instructions may be used by image source assembly 610 to generate image light. The scanning instructions may specify, for example, a type of a source of image light (e.g., monochromatic or polychromatic), a scanning rate, an orientation of a scanning apparatus, one or more illumination parameters, or any combination thereof. Controller 620 may include a combination of hardware, software, and/or firmware not shown here so as not to obscure other aspects of the present disclosure.

In some embodiments, controller 620 may be a graphics processing unit (GPU) of a display device. In other embodiments, controller 620 may be other kinds of processors. The operations performed by controller 620 may include taking content for display and dividing the content into discrete sections. Controller 620 may provide to light source 642 scanning instructions that include an address corresponding to an individual source element of light source 642 and/or an electrical bias applied to the individual source element. Controller 620 may instruct light source 642 to sequentially present the discrete sections using light emitters corresponding to one or more rows of pixels in an image ultimately displayed to the user. Controller 620 may also instruct projector 650 to perform different adjustments of the light. For example, controller 620 may control projector 650 to scan the discrete sections to different areas of a coupling element of the waveguide display (e.g., waveguide display 580) as described above with respect to FIG. 5B. As such, at the exit pupil of the waveguide display, each discrete portion is presented in a different respective location. While each discrete section is presented at a different respective time, the presentation and scanning of the discrete sections occur fast enough such that a user's eye may integrate the different sections into a single image or series of images.

Image processor 630 may be a general-purpose processor and/or one or more application-specific circuits that are dedicated to performing the features described herein. In one embodiment, a general-purpose processor may be coupled to a memory to execute software instructions that cause the processor to perform certain processes described herein. In another embodiment, image processor 630 may be one or more circuits that are dedicated to performing certain features. While image processor 630 in FIG. 6 is shown as a stand-alone unit that is separate from controller 620 and driver circuit 644, image processor 630 may be a sub-unit of controller 620 or driver circuit 644 in other embodiments. In other words, in those embodiments, controller 620 or driver circuit 644 may perform various image processing functions of image processor 630. Image processor 630 may also be referred to as an image processing circuit.

In the example shown in FIG. 6, light source 642 may be driven by driver circuit 644, based on data or instructions (e.g., display and scanning instructions) sent from controller 620 or image processor 630. In one embodiment, driver circuit 644 may include a circuit panel that connects to and mechanically holds various light emitters of light source 642. Light source 642 may emit light in accordance with one or more illumination parameters that are set by the controller 620 and potentially adjusted by image processor 630 and driver circuit 644. An illumination parameter may be used by light source 642 to generate light. An illumination parameter may include, for example, source wavelength, pulse rate, pulse amplitude, beam type (continuous or pulsed), other parameter(s) that may affect the emitted light, or any combination thereof. In some embodiments, the source light generated by light source 642 may include multiple beams of red light, green light, and blue light, or any combination thereof.

Projector 650 may perform a set of optical functions, such as focusing, combining, conditioning, or scanning the image light generated by light source 642. In some embodiments, projector 650 may include a combining assembly, a light conditioning assembly, or a scanning mirror assembly. Projector 650 may include one or more optical components that optically adjust and potentially re-direct the light from light source 642. One example of the adjustment of light may include conditioning the light, such as expanding, collimating, correcting for one or more optical errors (e.g., field curvature, chromatic aberration, etc.), some other adjustments of the light, or any combination thereof. The optical components of projector 650 may include, for example, lenses, mirrors, apertures, gratings, or any combination thereof.

Projector 650 may redirect image light via its one or more reflective and/or refractive portions so that the image light is projected at certain orientations toward the waveguide display. The location where the image light is redirected toward the waveguide display may depend on specific orientations of the one or more reflective and/or refractive portions. In some embodiments, projector 650 includes a single scanning mirror that scans in at least two dimensions. In other embodiments, projector 650 may include a plurality of scanning mirrors that each scan in directions orthogonal to each other. Projector 650 may perform a raster scan (horizontally or vertically), a bi-resonant scan, or any combination thereof. In some embodiments, projector 650 may perform a controlled vibration along the horizontal and/or vertical directions with a specific frequency of oscillation to scan along two dimensions and generate a two-dimensional projected image of the media presented to user's eyes. In other embodiments, projector 650 may include a lens or prism that may serve similar or the same function as one or more scanning mirrors. In some embodiments, image source assembly 610 may not include a projector, where the light emitted by light source 642 may be directly incident on the waveguide display.

In semiconductor LEDs, photons are usually generated at a certain internal quantum efficiency through the recombination of electrons and holes within an active region (e.g., one or more semiconductor layers), where the internal quantum efficiency is the proportion of the radiative electron-hole recombination in the active region that emits photons. The generated light may then be extracted from the LEDs in a particular direction or within a particular solid angle. The ratio between the number of emitted photons extracted from an LED and the number of electrons passing through the LED is referred to as the external quantum efficiency, which describes how efficiently the LED converts injected electrons to photons that are extracted from the device.

The external quantum efficiency may be proportional to the injection efficiency, the internal quantum efficiency, and the extraction efficiency. The injection efficiency refers to the proportion of electrons passing through the device that are injected into the active region. The extraction efficiency is the proportion of photons generated in the active region that escape from the device. For LEDs, and in particular, micro-LEDs with reduced physical dimensions, improving the internal and external quantum efficiency and/or controlling the emission spectrum may be challenging. In some embodiments, to increase the light extraction efficiency, a mesa that includes at least some of the layers of semiconductor materials may be formed.

Figure 7:
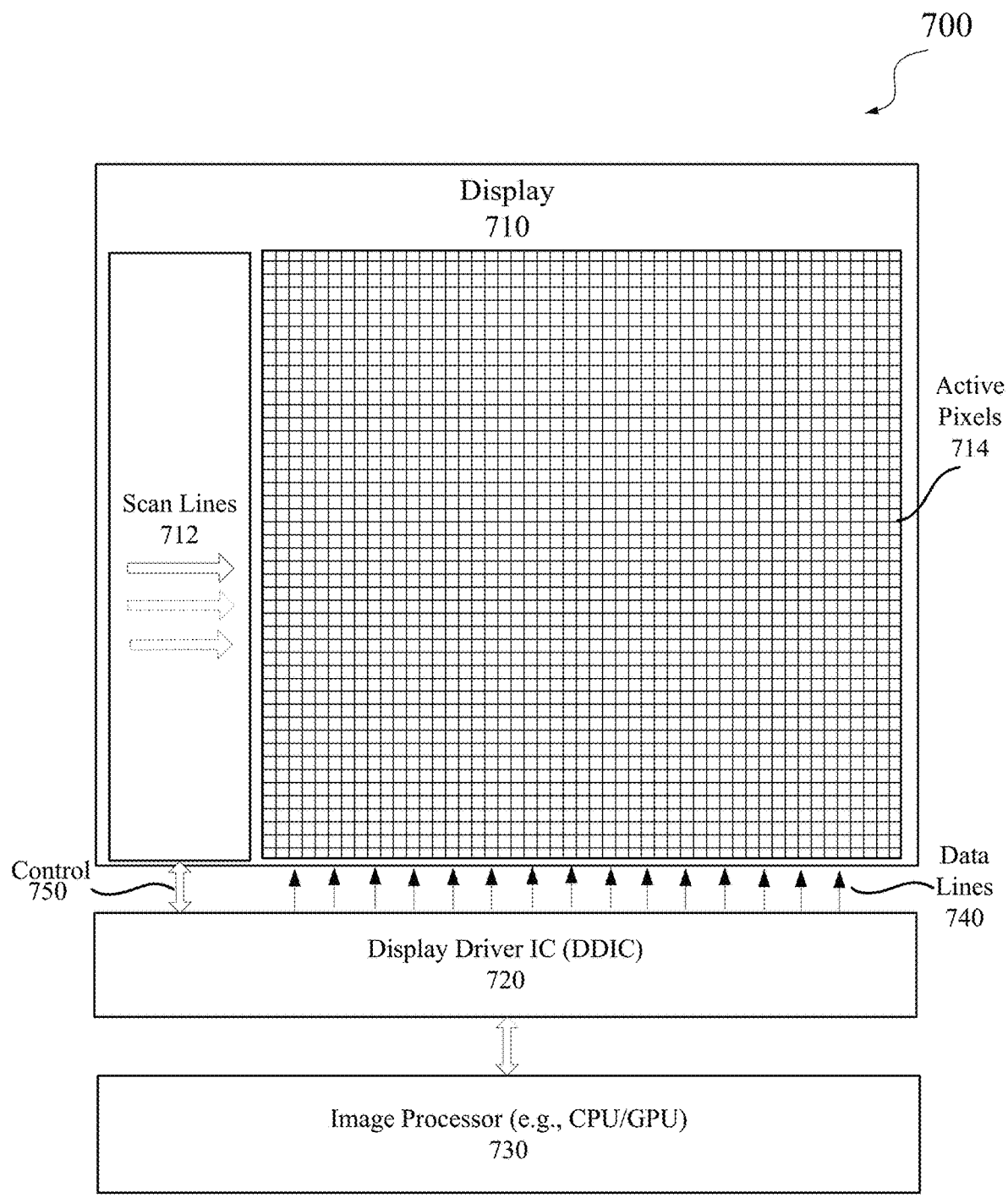
FIG. 7 is a simplified block diagram of an example of a display in an artificial reality system according to certain embodiments.

FIG. 7 is a simplified block diagram illustrating an example of a display system 700 including a display 710 according to certain embodiments. Display 710 may be any display panel described above, such as an AMOLED array or a micro-LED array. Display 710 may include active pixels 714 that are arranged in a two-dimensional pixel array. Each active pixel 714 may include three (red, green, and blue) light sources, such as AOLEDs or micro-LEDs. Each active pixel 714 may also include a driving and compensation circuit for each light source. The driving and compensation circuit may receive and store image data for the active pixel and provide a drive current to the light source for light emission.

The two-dimensional pixel array of active pixels 714 may be coupled to a plurality of scan lines 712 and a plurality of data lines 740 directly or indirectly. Each scan line 712 may be coupled to active pixels 714 on a row of the two-dimensional pixel array and may be used to connect active pixels 714 on a row of the two-dimensional pixel array to corresponding data lines 740. Each data line 740 may be coupled to active pixels 714 on a column of the two-dimensional pixel array through switches controlled by scan lines 712. Each data line 740 may be used to send image data to the active pixel 714 coupled to a scan line 712 that has been selected or activated. In general, the plurality of scan lines may be selected or activated one at a time to sequentially connect the active pixels coupled to the scan lines to corresponding data lines. The plurality of data lines 740 may be driven in parallel to send data to a row of active pixels 714 connected to a selected or activated scan line 712 at the same time.

Display 710 may also include some on-panel peripheral circuits, such an array of gates used to drive different scan lines for selecting pixels on the scan lines to receive image data for displaying. The peripheral circuits may be connected to a control bus 750, which may send control signal(s) to selectively activate (scan) the plurality of scan lines for receiving image data and turning on the light sources for light emission.

Data lines 740 and control bus 750 may be driven by a display driver IC (DDIC) 720. DDIC 720 may receive image data from an image processor 730 and send the received image data to active pixels 714 through data lines 740. In some implementations, DDIC 720 may not include a buffer. In some implementations, DDIC 720 may include a frame buffer, and thus may temporarily store the received image data and process the image data before sending the image data to data lines 740. For example, in some implementations, DDIC 720 may perform scrambling, distortion, correction, or other transformation of the image data. DDIC 720 may also generate scan control signals, such as clocks and various trigger signals, and send the scan control signals to display 710 through scan control bus 750.

Image processor 730 may include one or more CPUs or GPUs. Image processor 730 may receive information such as position information, acceleration information, velocity information, predicted future positions, or some combination thereof (e.g., from various sensors), and execute graphic processing applications (e.g., a game) to render image frames using the received information.

Many display systems may use rolling illumination techniques to display still images or video frames. In rolling illumination, image data is written to pixels in different rows in different time windows, and the pixels in different rows may be switched on to emit light in different time windows as well. For example, image data written into a pixel may be used to drive the pixel to emit light with no or a short constant wait time. Thus, each row of pixels in a two-dimensional array of pixels may emit light during a different (staggered) respective time window. In rolling illumination, the hold time for image data written to different rows may be short and may be the same for all pixels, such that the amount of leakage during the hold time may be low and may be the same. Therefore, the leakage may not cause non-uniformity in the displayed images.

Figure 8:
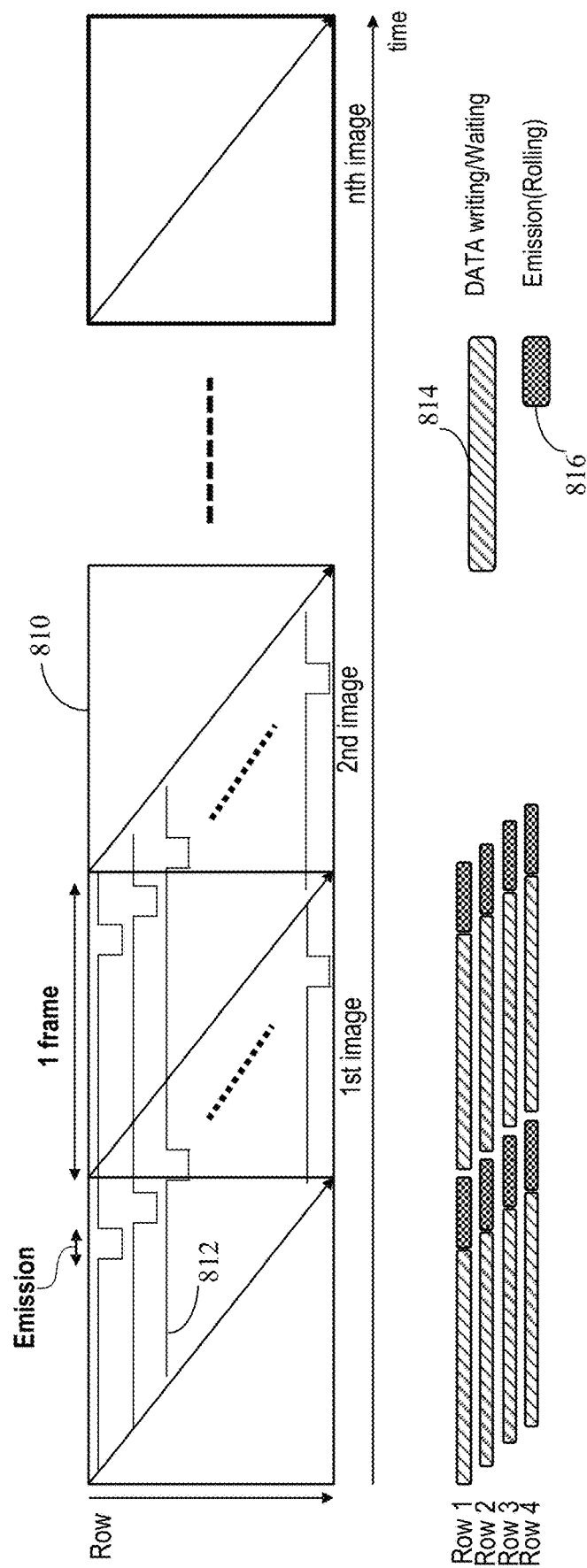
FIG. 8 illustrates an example of driving pixels of a display for rolling illumination.

FIG. 8 illustrates an example of driving pixels of a display for rolling illumination. As illustrated, image data for each image frame 810 may be written to the pixels one row at a time as described above with respect to FIG. 7. Image data for each row 812 may be written into the pixels in the row during a same data writing and/or waiting period 814, the pixels in the row may then be turned on to emit light during a same emission period 816, where the luminance of the pixels may be a function of the image data. The data writing and/or waiting periods 814 for different rows of pixels may be staggered such that image data may be written into one row of pixels at a time. The emission periods 816 for different rows of pixels may also be staggered. After the image data for a first image frame 810 is written into the pixels, image data for a second image frame 810 may be written into the pixels one row at a time to display the second image frame 810.

Figure 9A:
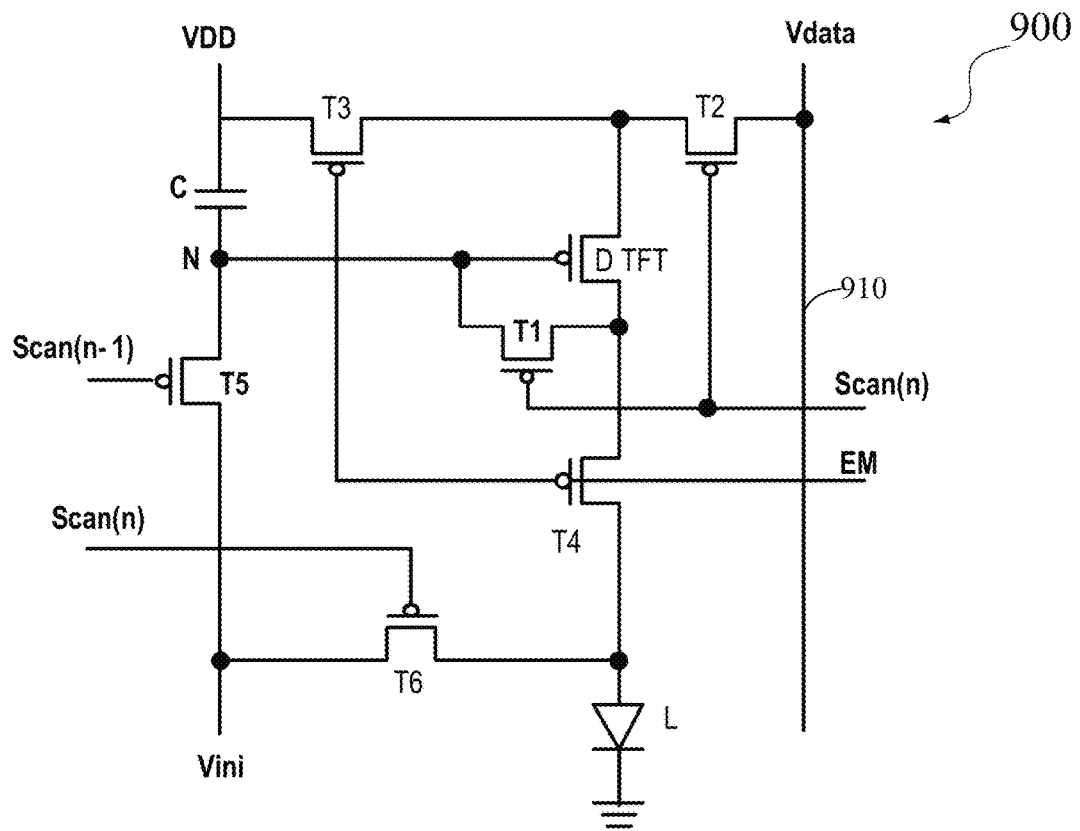
FIG. 9A illustrates an example of a driving and compensation circuit for each light source in a display according to certain embodiments.

FIG. 9A illustrates an example of a driving and compensation circuit 900 for each light source in a display according to certain embodiments. In some displays, such as AMO-LED displays or micro-LED display, the display driver integrated circuit (e.g., driver circuit 644 or DDIC 720) may include a respective driver circuit for each light source. Thus, for a color display where each pixel includes three light sources (e.g., a red LED, a green LED, and a blue LED), three driving and compensation circuits 900 may be used for each pixel.

In the illustrated example, driving and compensation circuit 900 may include seven transistors and one capacitor, and thus may be referred to as a 7T1C compensation circuit. The seven transistors may include six transistors T1-T6 and a driver thin film transistor (D TFT). In some embodiments, each of transistors T1-T6 and D TFT may be implemented using a P-channel or N-channel thin film transistor (TFT). Each of transistors T1 to T6 and D TFT may include a gate, a source, and a drain. The source and drain may be referred to as a first terminal and a second terminal.

Transistor T1, transistor T2, and transistor T6 may be controlled by a scan signal Scan(n). Transistor T5 may be controlled by a scan signal Scan(n-1). Transistor T3 and transistor T4 may be controlled by a light emitting control signal EM. Transistor T1, when turned on, may connect the gate of transistor D TFT to a terminal (e.g., drain) of transistor D TFT during a sampling (or compensation) period. Transistor T2 may be used to supply a data voltage $V_{data}$ on a data line 910 to another terminal (e.g., the source) of transistor D TFT during the sampling (or compensation) period. Transistor T3 may be used to supply a high voltage supply voltage VDD to a source of transistor D TFT during a light emitting period. Transistor T4 may send a driving current supplied from transistor D TFT to an LED L (e.g., an OLED or a micro-LED) during the light emitting period. Transistor T5 may be used to connect a node N that is connected to the gate of transistor D TFT and a storage capacitor C to an initialization voltage $V_{ini}$ during an initialization period. Transistor T6 may be used to apply an initialization voltage to LED L (e.g., to set LED L in a reverse bias state).

Figure 9B:
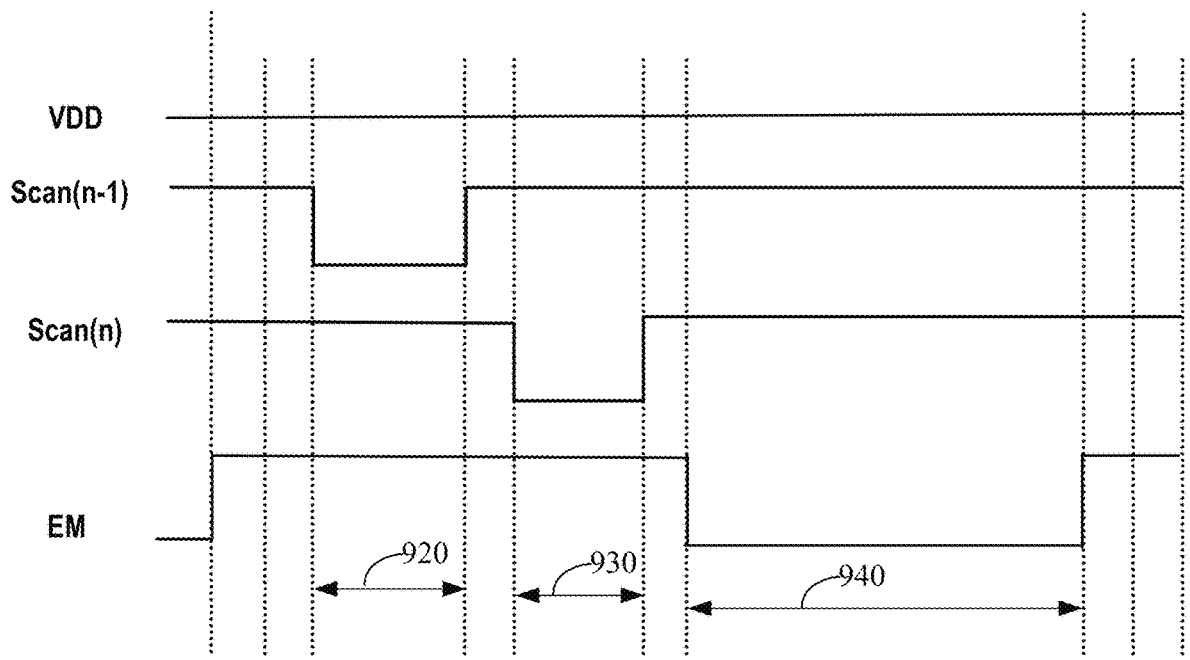
FIG. 9B illustrates examples of control signals for controlling the operation of the example of driving and compensation circuit shown in FIG. 9A.

FIG. 9B illustrates examples of control signals for controlling the operations of driving and compensation circuit 900 shown in FIG. 9A. During an initialization period 920, scan signal Scan(n-1) is at a low level, while scan signal Scan(n) and light emitting control signal EM may be at a high level. Thus, transistors T1-T4, T6, and DTFT are turned off by scan signal Scan(n) and light emitting control signal EM, whereas transistor T5 may be turned on by scan signal Scan(n-1) to initialize node N to an initialization voltage $V_{ini}$.

During a sampling (or compensation) period 930, scan signal Scan(n) is at a low level, while scan signal Scan(n-1) and light emitting control signal EM may be at a high level. Therefore, transistors T3, T4, and T5 may be turned off, while T1, T2, and T6 may be turned on by scan signal Scan(n). When turned on, transistor T2 may supply the data voltage $V_{data}$ on data line 910 to the source of transistor D TFT. When turned on, transistor T1 may connect the gate and the drain of transistor D TFT such that transistor D TFT operates as a diode with a threshold voltage $V_{th}$. As such, a voltage $V_{data}-V_{th}$ may be supplied to the gate of transistor D TFT and node N. Accordingly, storage capacitor C may be charged to a voltage $VDD-V_{data}+V_{th}$. When turned on, transistor T6 may connect an anode of LED L to the initialization voltage $V_{ini}$ to initialize the anode of LED L to initialization voltage $V_{ini}$.

During a light emitting period 940, light emitting control signal EM is at a low level, while scan signal Scan(n) and scan signal Scan(n-1) may be at a high level. Therefore, transistors T3 and T4 may be turned on by light emitting control signal EM, whereas T1, T2, T5, and T6 may be turned off. When turned on, transistor T3 may supply the high voltage supply voltage VDD to the source of transistor D TFT, while the gate of transistor D TFT (i.e., node N) may be at a voltage $V_{data}-V_{th}$. Thus, the voltage $V_{gs}$ between the gate and source of the driving transistor (transistor D TFT) may be $VDD-V_{data}+V_{th}$. Therefore, transistor D TFT may have a drive current $I_{ds}=k\times(V_{gs}-V_{th})^2=k\times(VDD-V_{data}+V_{th}-V_{th})^2=k\times(VDD-V_{data})^2$, where k is a coefficient that depends on the mobility, the channel width, and the channel length of the driving transistor D TFT. Therefore, the drive current may be a function of $V_{data}$. When turned on, transistor T4 may supply the driving current $I_{ds}$ provided by transistor D TFT to LED L such that LED L may emit light.

In an artificial reality display system, such as a VR/AR/MR display system, consecutive image frames, rather than still images, may be presented to the user based on the movement of the head or eye of the user. Thus, in an artificial reality display system, the movement or position of the user's head or eye may be tracked, and images for the left and right eyes may then be rendered based on the position of a user's head or eye for displaying by one or two display panels that each include a two-dimensional array of pixels, such as an AMOLED array or a micro-LED array. Because the image rendering time may be relatively long, the position of the user's head or eye after the rendering time may have changed from the position before the image rendering. As such, the displayed images may have judder or motion-to-photon latency with respect to the changes in head and/or eye positions. In order to reduce the judder and motion-to-photon latency and/or to increase the frame rate (e.g., for gaming), timewarping techniques can be used to re-project the initially rendered image slightly to adjust for the changes in the head and/or eye positions.

Figure 10:
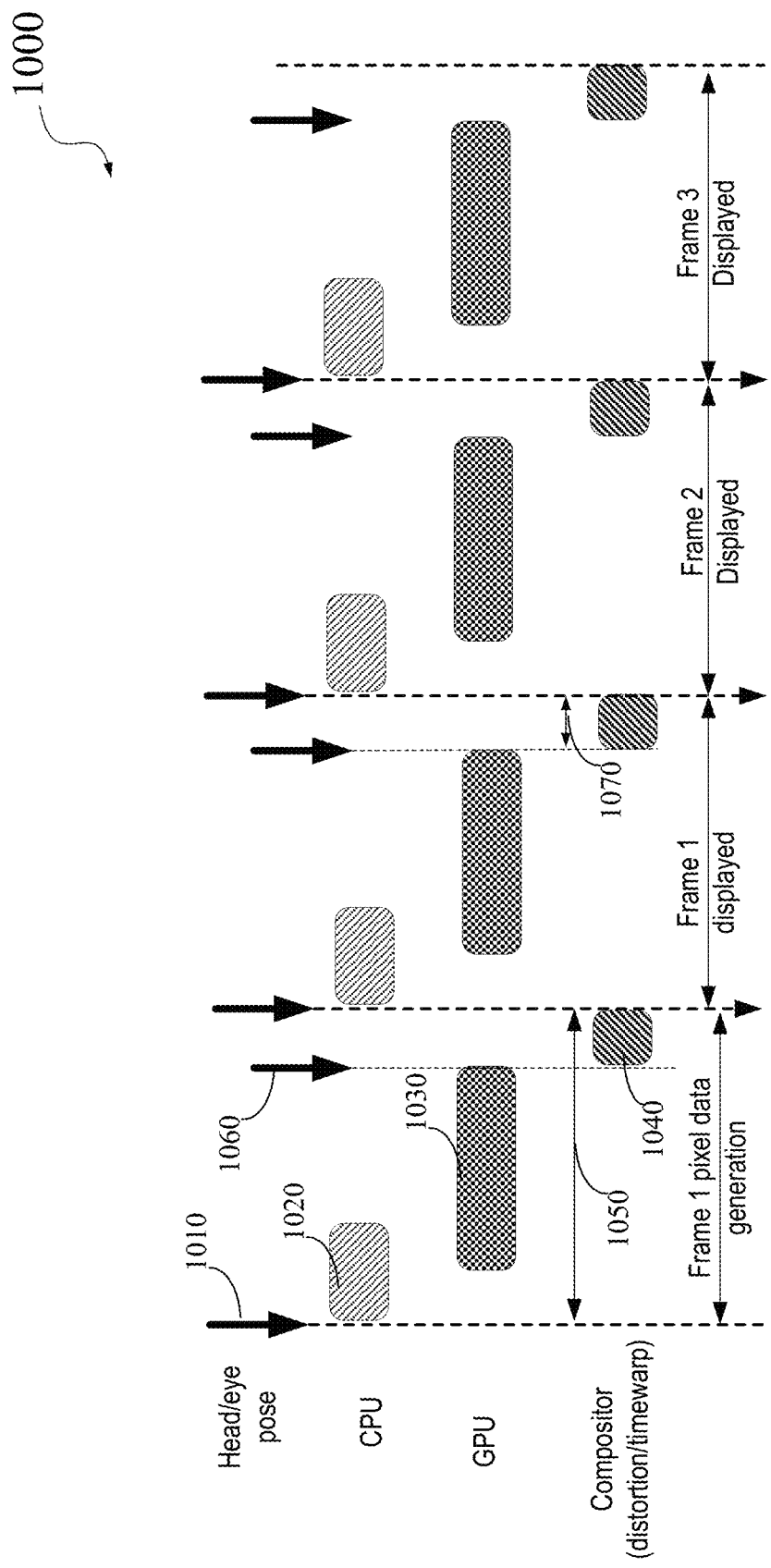
FIG. 10 illustrates an example of timing warping for reducing motion-to-photon latency and improving the frame rate in artificial reality applications.

FIG. 10 illustrates an example of timing warping for reducing motion-to-photon latency and improving the frame rate in artificial reality applications. In an artificial reality application, such as a VR game, the head or eye position (e.g., location and/or orientation) of a user may be determined by a head or eye tracking system. One or more CPUs may process the scene for each eye of the user based on the head or eye position of the user. One or more GPUs may be used to render the image for each eye from a different respective view angle to achieve the stereoscopic effect. The image rendering (or image synthesis) is a process of generating a photorealistic or non-photorealistic image from a 2D or 3D model and scene files, which may include, for example, geometry, viewpoint, texture, lighting, and shading information of a virtual scene. Image rendering may be performed using, for example, rasterization, ray casting, or ray tracing techniques. The rendered image may include various visible features, such as shading, texture, and shadows. A high computation power and/or a long processing time may be needed for the rendering. The rendered images may be further processed by a compositor to perform, for example, distortion correction to correct certain lens-related distortions.

In the illustrated example, the position of the user's head and/or eye may be determined at a time instant 1010. One or more CPUs may receive user inputs, process the scene for each eye of the user, and issue commands to one or more GPUs during a time window 1020. For example, a CPU may read user inputs and run simulations to calculate a scene including various objects (e.g., people, buildings, trees, cars, etc.), another CPU may issue rendering commands to the one or more GPUs. The one or more GPUs may convert the scene to drawing commands to render the images for the left and right eyes during a time window 1030. A compositor may make distortion correction in a time window 1040. After time window 1040, the user's head or eye may have moved from the head or eye's original position at time instant 1010. Thus, if the rendered image data is sent to the display driver after time window 1040 for displaying, there may be a significant amount of delay 1050 (sometimes referred to as motion-to-photon latency) between the displayed image and the movement of the user's head or eye, which may be one of the reasons for motion sickness. For example, in a 60-fps game, a new scene is displayed every 16.7 milliseconds. Without any delay or latency reduction, each image a user sees may be based on the position data obtained at least about 16.7 milliseconds ago.

In some embodiments, rather than re-rendering the image, re-projection techniques, such as timewarping techniques, may be used to reduce the motion-to-photon latency to a value that is not noticeable by the user by shifting the rendered image slightly to adjust for the changes in the positions of the head or eye. Timewarping techniques re-project a rendered frame before sending it to the display to account for the changes in the positions of the head or eye. For example, timewarping techniques may warp the image geometrically (e.g., by matrix multiplications) in the direction the user rotates the head. Timewarping may only take a fraction of the rendering time and the wrapped frame may be sent to the display immediately after. Therefore, the delay or latency is much lower.

In the example of timewarping shown in FIG. 10, after the position of the user's head and/or is captured at time instant 1010 and the scene is simulated and rendered based on the position of the user's head and/or eye in time windows 1020 and 1030, the position of the user's head and/or eye may be captured again at a time instant 1060. The initial rendered image may then be modified (e.g., re-projected) by a mathematical calculation (e.g., matrix multiplication) in time window 1040, based on the position of the user's head and/or eye at time instant 1060, to generate a final rendered image. The final rendered image data may then be sent to a frame buffer of a display for displaying to the user. As such, the delay (or motion-to-photon latency) 1070 may be only a fraction of delay 1050. Therefore, the displayed image is more recent and more accurately depicts the position of the user's head and/or eye at the time of display (light emission) than the initially rendered image. Timewarping may also help to achieve a higher frame rate by artificially filling in dropped frames. For example, when the rendering time is long, the last completely rendered frame, rather than the frame that is being rendered, may be updated with the latest tracking data about the position of the user's head or eye.

In some embodiments, rather than recapturing the position of the user's head and/or eye after the initial image is rendered, the position of the user's head and/or eye at the time when a row of pixels emit light may be predicted based on the predicted time of light emission and the previous tracking data, such as the speed and direction of the movement of the head and/or eye. The predicted position of the user's head and/or eye may then be used to re-project the image to generate the final rendered image data. When the prediction is accurate, the motion-to-photon latency can be close to zero.

Figure 11:
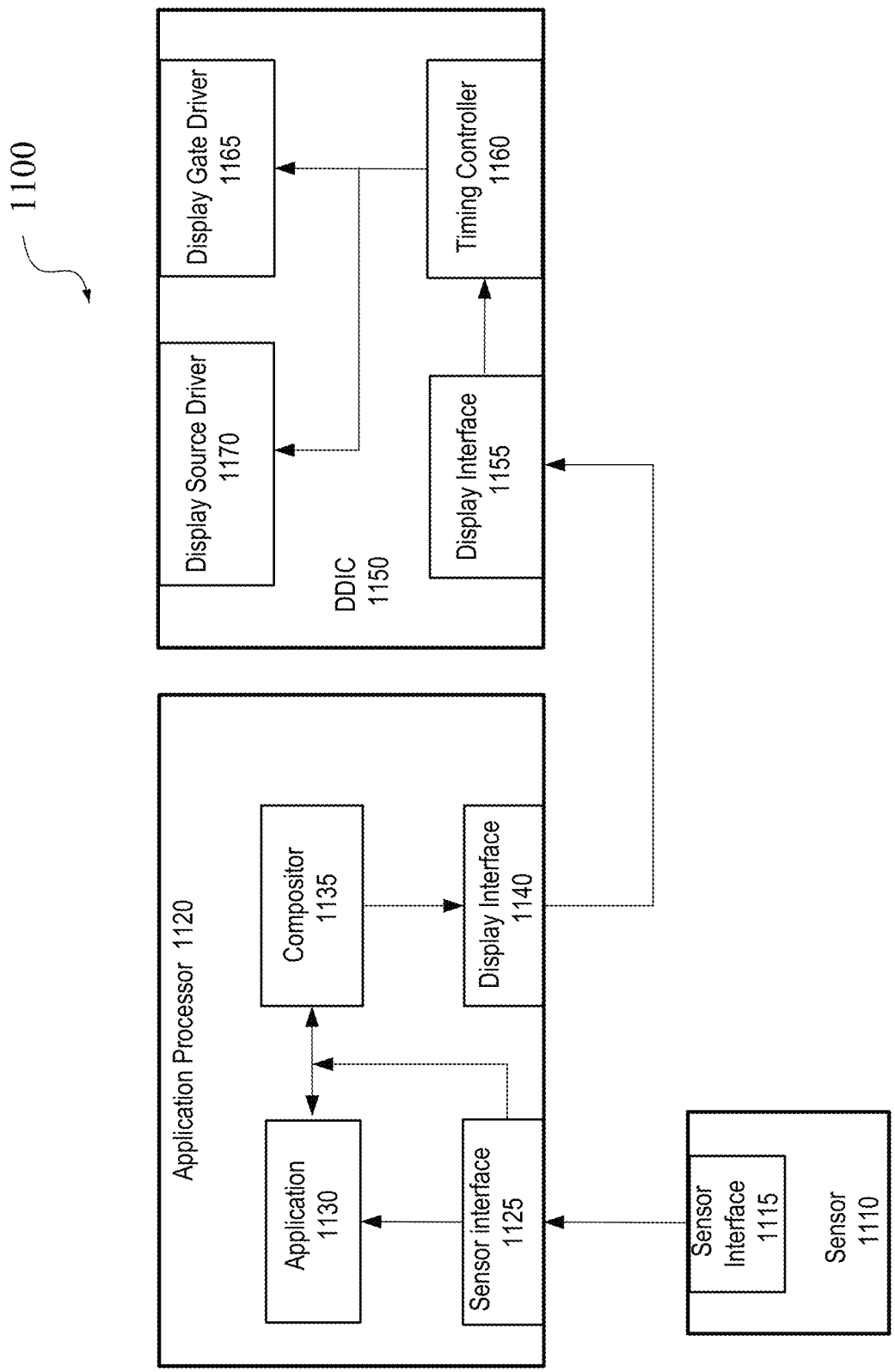
FIG. 11 is a simplified block diagram of an example of a display controller for a near-eye display system according to certain embodiments.

FIG. 11 is a simplified block diagram of an example of a display controller 1100 for a near-eye display system according to certain embodiments. Display controller 1100 may be incorporated within the artificial reality engine 116 described above and may be an example of near-eye display system 600 or display system 700. Display controller 1100 may include an application processor 1120 and a display driver integrated circuit (DDIC) 1150. Application processor 1120 may include one or more processors, such as one or more CPUS and/or GPUs. Display controller 1100 may receive data from a sensor 1110 having a sensor interface 1115. Sensor 1110 may be used to track the movement of the user's head or eye as described above. Sensor interface 1115 of sensor 1110 may transmit head-tracking or eye-tracking data to a sensor interface 1125 of application processor 1120.

Sensor interface 1125 of application processor 1120 may then send the tracking data to an application 1130 (e.g., an VR game), which may simulate and render the images to be displayed to the user's left eye and right eye as described above. Application 1130 may send the rendered images to a compositor 1135. Compositor 1135 may make predictions of the movement of the user's head or eye (or may receive the latest tracking data through sensor interface 1125) to determine a new position of the user's head or eye. Compositor 1135 may perform re-projection, such as distortion correction and timewarping, on the rendered images based on the predicted (or recaptured) new position of the head or eye of the user to generate final rendered image data. The final rendered image data may then be sent to a display interface 1155 of DDIC 1150 through a display interface 1140.

Display interface 1155 of DDIC 1150 may save the received image data in a frame buffer (not shown) or directly send the image data to a timing controller 1160. Timing controller 1160 may use the image data to provide instructions to a display gate driver 1165 and a display source driver 1170, which may drive the light sources in the display to emit light as described above with respect to FIG. 7. For example, display gate driver 1165 may be used to provide scan control signals to scan lines 712 through scan control bus 750. Display source driver 1170 may send display data to active pixels 714 through data lines 740. In some embodiments, display source driver 1170 and/or display gate driver 1165 may perform gamma correction (e.g., apply display gamma to correct or offset image gamma) and provide drive currents or voltages to the light sources based on a transfer function between input display values (e.g., gray levels or drive levels) and luminance levels.

In some rendering techniques, such as the rasterization-based rendering techniques, application 1130 may only accept a single pose or position (based on a single emission time) as input for rendering an image frame. In rolling illumination described above with respect to FIG. 8, different rows of pixels may have different emission time. Thus, the image frame may not be properly rendered for all rows of pixels in one rendering process by the rendering techniques, such as the rasterization-based rendering techniques.

As such, each row of the image frame may need to be rendered separately based on different estimated positions at different emission time. Alternatively, a single emission time for one row of pixels (the first row or the middle row) may be selected to estimate the pose or position for rendering the image frame, and timewarping may be performed for each of other rows of pixels to reduce the motion-to-photon latency. For example, different respective position data may need to be captured or predicted for each row of pixels, and different respective re-projection (e.g., image shift) may need to be performed for each row of pixels, because of the different emission time of the different rows with respect to the beginning of a frame. Thus, for an image with many rows (e.g., a few hundred or over a thousand rows), a high computation power or a long computation time may be needed to render (including timewarping) the final image for display.

Figure 12:
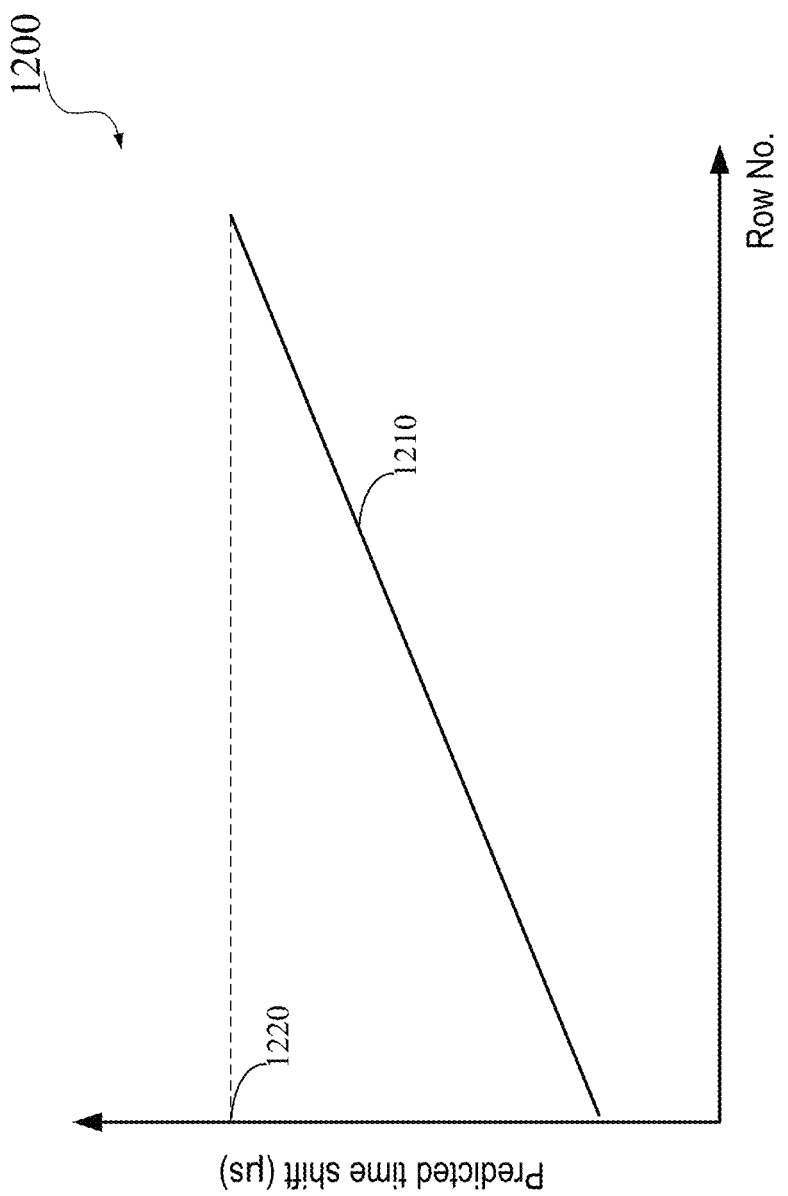
FIG. 12 includes a chart illustrating different amounts of predicted time shift for different rows of pixels in an image frame displayed by rolling illumination.

FIG. 12 includes a chart 1200 illustrating different amounts of predicted time shifts for different rows of pixels in an image frame displayed by rolling illumination. The predicted time shift may be illustrated by a curve 1210. The prediction time shift may be the difference between the time when the original tracking data (e.g., eye or head tracking data) is captured and the time when the light sources in a row of pixels of the display emit light to display the row of pixels of the image. The prediction time shift may be determined by, for example, compositor 1135, based on the time when the light sources in a row of pixels of the display emit light. As illustrated in the example, the predicted time shift may be smaller for the rows of pixels that may emit earlier and may be larger for rows of pixels that may emit later. The maximum predicted time shift may be shown by a time shift 1220 for the row of pixels that may emit at the last for a frame. The position of the head or eye of the user may be estimated by, for example, compositor 1135, based on the tracked movement (e.g., speed and direction) of the head or eye of the user and the predicted time shift shown by curve 1210.

In displays using global illumination, pixels in different rows emit light at the same time. Thus, a common time shift (and pose) prediction and image shift may be performed for all rows of pixels in each frame. For example, the predicted time shift may be time shift 1220 for all rows of pixels. A common estimated position of the head or eye at the time of light emission may be determined based on time shift 1220, and a common image rendering or re-projection (e.g., timewarping) may be performed for all rows of pixels of an image frame based on the common estimated position. Thus, the computation complexity for image rendering or image timewarping may be much lower than that in rolling illumination.

Figure 13:
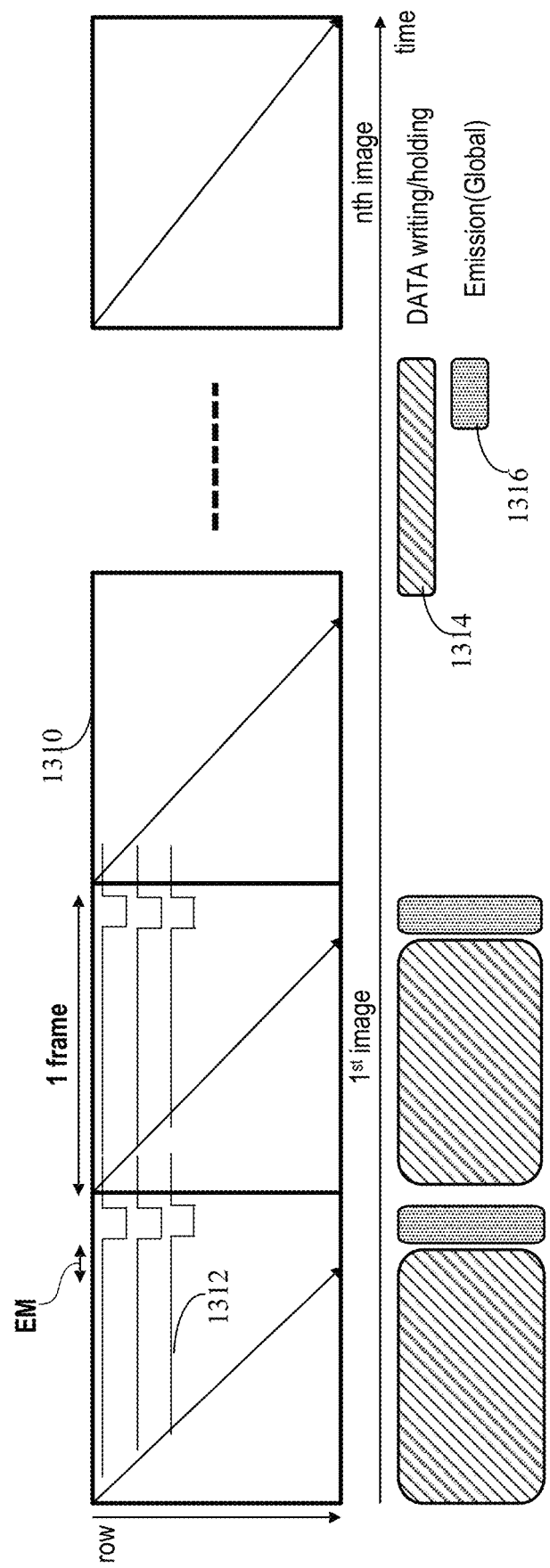
FIG. 13 illustrates an example of driving pixels of a display for global illumination according to certain embodiments.

FIG. 13 illustrates an example of a method of driving pixels of a display for global illumination according to certain embodiments. As illustrated, image data for each frame 1310 may be written to the pixels one row at a time as described above with respect to FIG. 7. Image data for each row 1312 may be written into pixels in the row during a data writing and/or waiting period 1314. After the image data for all rows of pixels is written, the pixels in all rows may be turned on (e.g., by a low level on light emitting control signal EM shown in FIGS. 9A-9B) to emit light during a same emission period 1316, where the luminance of the pixels may be a function of the image data as described above with respect to, for example, FIGS. 9A-9B. After image data for a first frame is written into the pixels, image data for a second frame may be written into the pixels one row at a time, and all pixels may be turned on in a same emission period 1316 to display the second frame based on the image data.

In some embodiments, because different rows of pixels of the display emit light at the same time, a common position of the user's head and/or eye at the time of the illumination for all pixels in a frame may be estimated before the image rendering. The common estimated position may then be used to render the image for the frame using, for example, rasterization-based rendering techniques. As such, no time-warping may be needed to re-project the rendered image.

As described above, in global illumination, the image data (e.g., data voltage $V_{data}$) is written to different rows of pixels sequentially at different times, and the different rows of pixels emit at the same time. Therefore, the image data for different rows of pixels may be held at the storage capacitors (e.g., storage capacitors C) for different periods of time before the image data is used to provide drive currents to the light sources (e.g., LEDs L, such as OLEDs or micro-LEDs). Due to the leakage in the driving circuits, the stored image data at node N right before the light emission may be different from the initial image data (e.g., $V_{data}-V_{th}$) written to nodes N of the pixels. When the image data is held for a longer time period, the leakage may be larger, and the image data may be changed by a larger value. As such, the leakage of the image data may be different for different rows of pixels because of the different hold time, which may cause non-uniformity and/or color shift in the displayed images.

Figure 14:
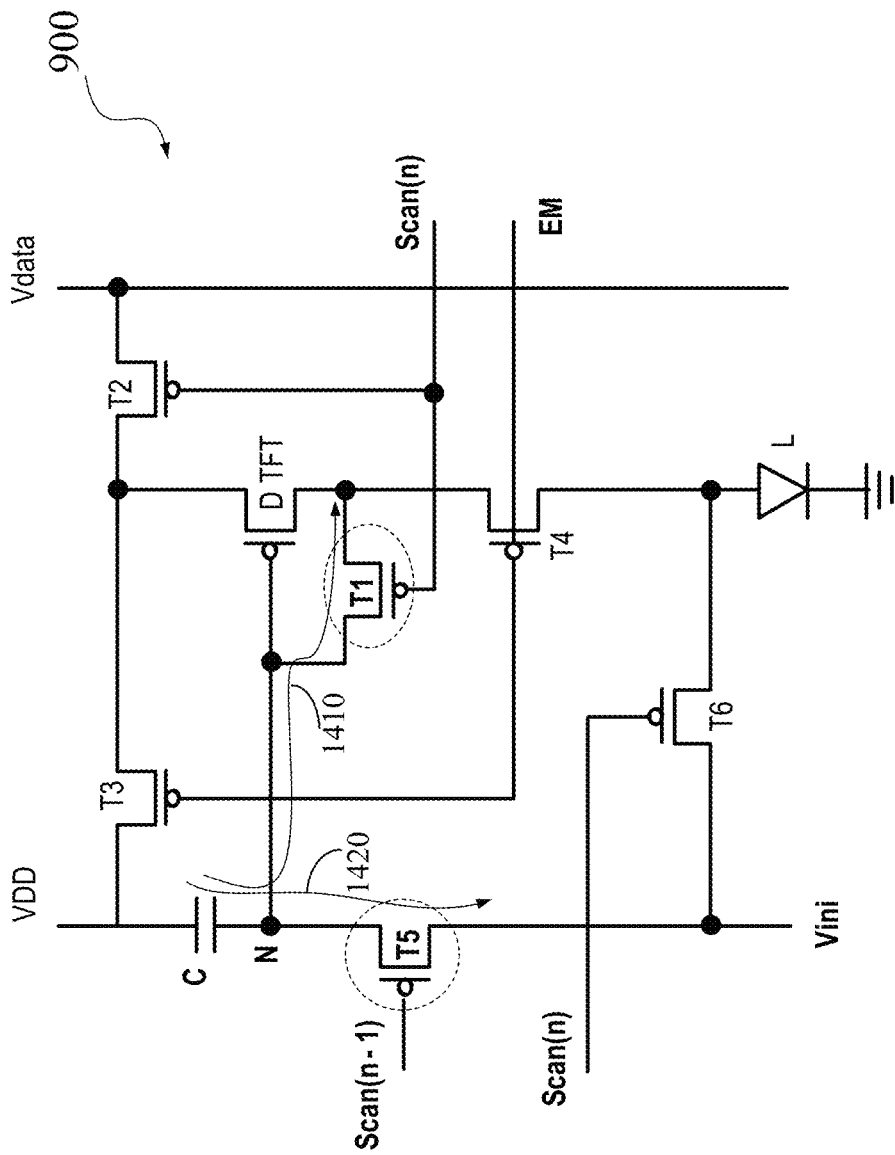
FIG. 14 illustrates examples of leakage paths in the example of the driving and compensation circuit shown in FIG. 9A.

FIG. 14 illustrates examples of leakage paths in the example of driving and compensation circuit 900 shown in FIG. 9A. As described above, during the sampling (or compensation) period 930, a voltage $V_{data}-V_{th}$ may be supplied to the gate of transistor D TFT and node N. Accordingly, storage capacitor C may have a voltage VDD−($V_{data}-V_{th}$) across it. The voltage at node N may be held by storage capacitor C. As illustrated, there may be leakage paths from node N to other portions of driving and compensation circuit 900. For example, there may be leakage current 1420 from node N to initialization voltage $V_{ini}$ through transistor T5. Charges at node N may also be leaked by a leakage current 1410 through transistor T1. The leakage current may depend on the operating conditions of the transistors, such as the voltage between the source and the drain ($V_{ds}$) and the voltage level at the gate of a transistor ($V_G$). The total amount of charge leakage may be a product of the leakage current and the hold time. Thus, at the beginning of the emission period 940, the voltage at the gate of driving transistor (transistor D TFT) may no longer be $V_{data}-V_{th}$, and hence Vgs of transistor D TFT may not be VDD−$V_{data}+V_{th}$ and the drive current supplied by transistor D TFT may not be k×(VDD−$V_{data}$)$^2$. Therefore, the luminance level of the light source may not be the desired value, which may cause color or gray level shift in the displayed image. In addition, pixels on different rows may have different hold time and thus different amounts of leakage. Therefore, the display image may not be uniform across the different rows of pixels.

Figure 15:
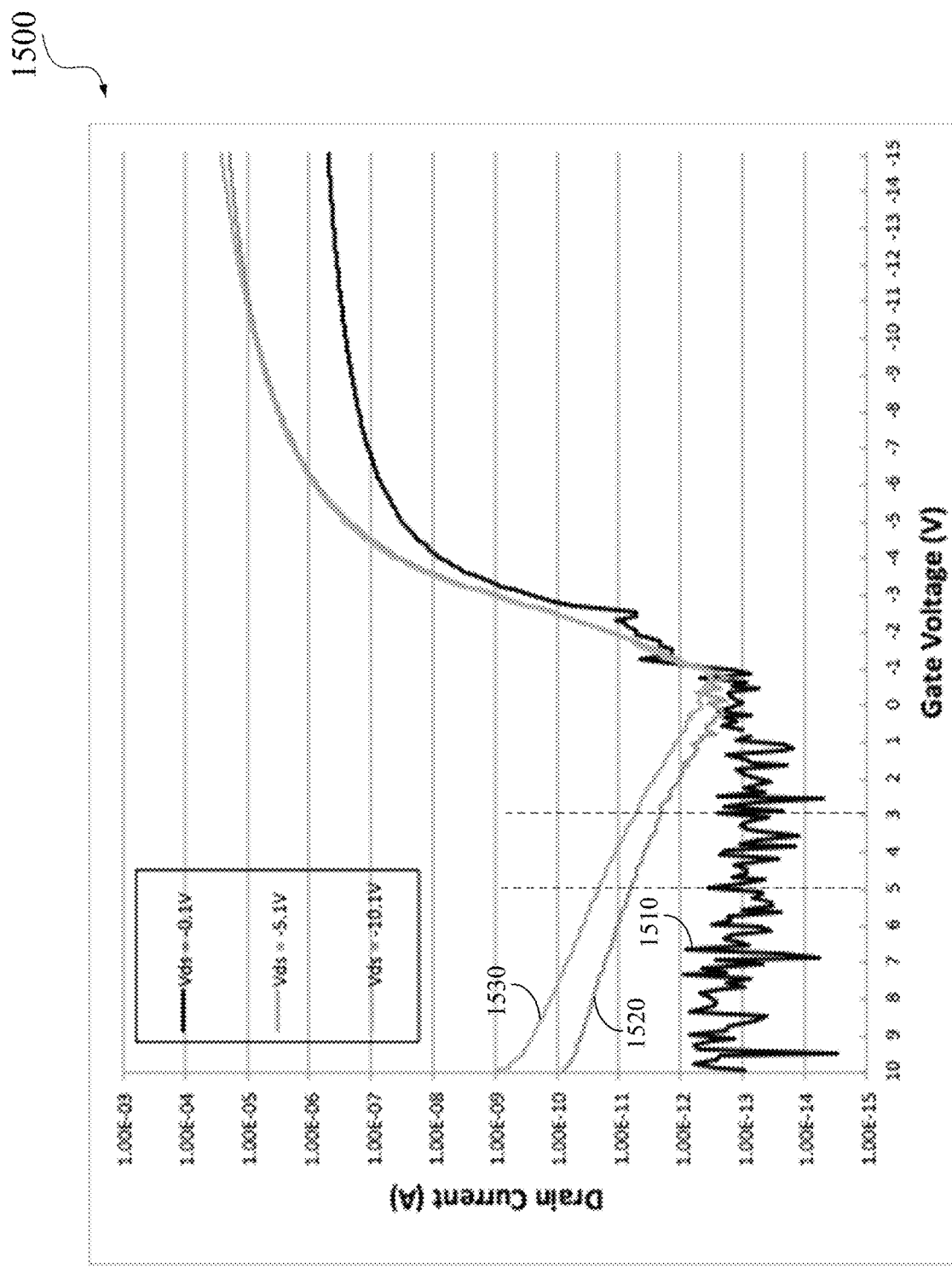
FIG. 15 illustrates examples of leakage currents of a transistor under different operating conditions.

FIG. 15 includes a diagram 1500 illustrating examples of leakage currents of a transistor under different operating conditions. In diagram 1500, the horizontal axis represents the voltage at the gate of a p-type transistor, such as a P-type metal-oxide-semiconductor (PMOS) transistor or a p-type TFT transistor. The vertical axis corresponds to the drain current. The p-type transistor may be turned on when the voltage at the gate is lower than the voltage at the source and may be turned off when the voltage at the gate is higher than the voltage at the source. When turned on, the transistor can have a high drain current. Even when the transistor is turned off, there might be leakage current between the drain and source of the transistor as shown by curves 1510, 1520, and 1530. Curve 1510 shows the drain currents for different gate voltages when the voltage between the source and the drain ($V_{ds}$) is 0.1 V. Curve 1520 shows the drain currents for different gate voltages when the voltage between the source and the drain ($V_{ds}$) is −5.1 V. Curve 1530 shows the drain currents for different gate voltages when the voltage between the source and the drain ($V_{ds}$) is −10.1 V.

According to certain embodiments, leakage-compensated global illumination techniques may be used to display video frames for VR/AR/MR applications. A common image rendering or a common timewarping of the rendered image can be performed for all rows of pixels of an image frame (based on a common measured or predicted head and/or eye position), rather than for each row of pixels, thereby reducing the computation complexity and computation time. Because of the lower computation complexity and shorter computation time for image rendering and/or timewarping, the motion-to-photon latency can be reduced and/or the frame rate of the displayed video can be increased. In addition, the image data for different rows of pixels of a display may be pre-compensated by different amounts based on the operation conditions, predicted or pre-determined leakage currents (e.g., as shown in FIG. 15), and the different hold time periods for different rows of pixels. For example, the image data generated by the application and/or the compositor after the distortion correction and/or timewarping described above with respect to FIG. 11 may be pre-compensated to account for the different amounts of leakage at different rows of pixels, before the image data is sent to the DDIC. The rows of pixels may then emit at the same time for global illumination based on the image data stored at the pixels. In this way, the display data can be at the desired values right before the global illumination even if the display data may be leaked by different amounts for different rows of pixels after the image data is loaded into the pixels. Thus, techniques disclosed herein can also reduce the non-uniformity and color shifting issues associated with global illumination, thereby improving the image and video quality for global illumination in VR/AR/MR systems.

Figure 16:
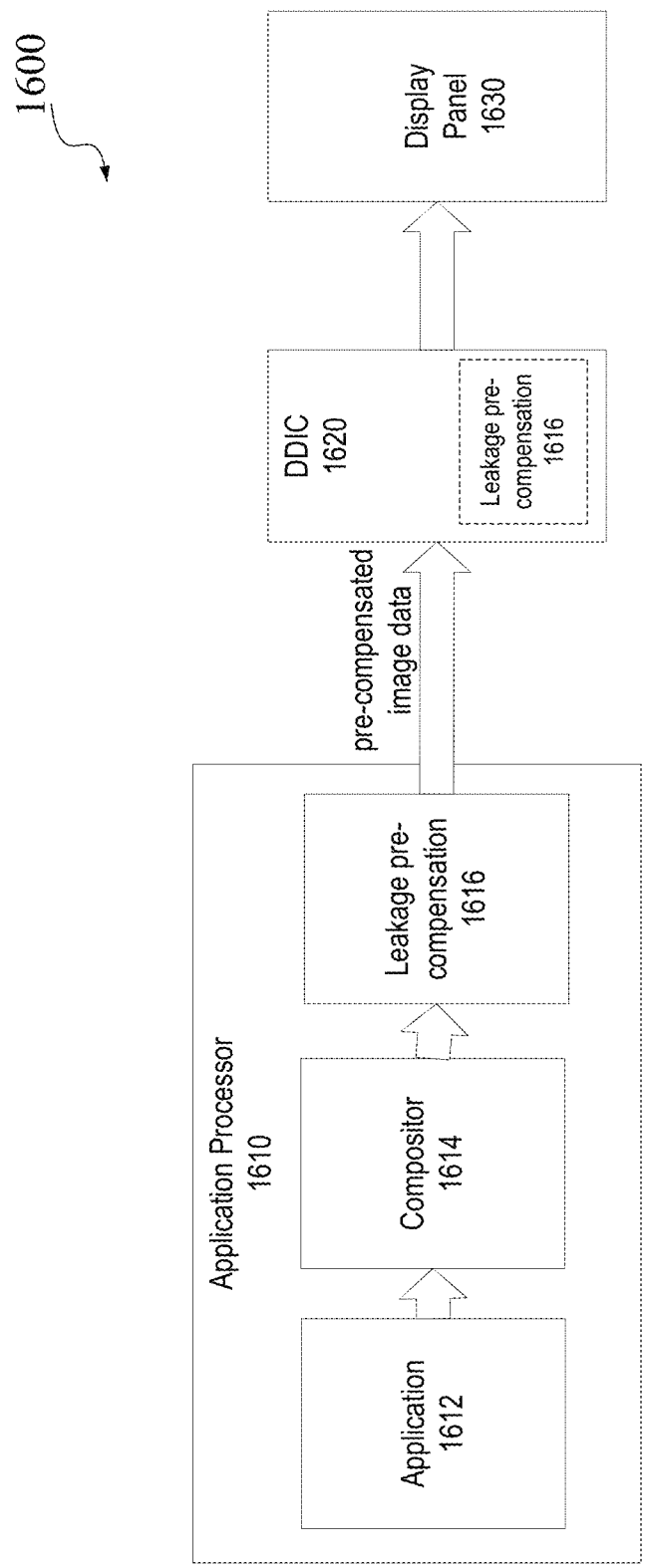
FIG. 16 illustrates a simplified block diagram of a display with leakage compensation for global illumination according to certain embodiments.

FIG. 16 illustrates a simplified block diagram of an example of a display 1600 with leakage compensation for global illumination according to certain embodiments. Display 1600 may include an application processor 1610, a DDIC 1620, and a display panel 1630. Application processor 1610 may include one or more GPUs or other image processors. Application processor 1610 may execute an application 1612 (e.g., an VR game) to render images to be displayed to the user's left eye and right eye based on the measured or estimated position of the user's head or eye as described above. Application 1612 may send the initial rendered images to a compositor 1614. Compositor 1614 may make predictions of the movement of the user's head or eye (or may receive the latest tracking data) to determine a position of the user's head or eye. Compositor 1614 may also perform re-projection (e.g., distortion correction and/or timewarping) on the initial rendered images based on the predicted (or recaptured) position of the head or eye of the user to generate re-projected image data.

For example, in some embodiments, application 1612 may render an image based on the position of the user's head or eye measured or otherwise obtained at the beginning of a frame. Compositor 1614 may obtain the new position of the user's head or eye after the image is rendered, and re-project (e.g., timewarping) the rendered image based on the new position.

In some embodiments, application 1612 may render an image based on the position of the user's head or eye measured or otherwise obtained at the beginning of a frame. Compositor 1614 may estimate the position of the user's head or eye at the time of global illumination, and re-project (e.g., timewarping) the rendered image based on the estimated position.

In some embodiments, compositor 1614 may estimate the position of the user's head or eye at the time of global illumination and send the estimated location to application 1612. Application 1612 may render an image based on the estimated position of the user's head or eye. Compositor 1614 may perform, for example, distortion corrections, on the rendered image.

Application processor 1610 may also perform leakage pre-compensation operation 1616 on the re-projected image data to generate final rendered image data. As described above, the leakage pre-compensation may be based on the leakage current under the operation condition (e.g., as shown in FIG. 15) and the hold time of the image data for a row of pixels. For example, for rows of pixels that are written earlier, the pre-compensation values may be larger due to the larger amounts of leakage. The final rendered image data may then be sent to DDIC 1620, such as a frame buffer in DDIC 1620. In some embodiments, leakage pre-compensation operation 1616 may be performed by an internal DDIC or DDIC 1620.

As described above with respect to, for example, FIG. 11, DDIC 1620 may include a timing controller (e.g., time controller 1160) that may use the received image data to provide instructions to a display gate driver (e.g., display gate driver 1165) and a display source driver (e.g., display source driver 1170), which may load image data to the pixels in display panel 1630 and turn on the light sources to emit light as described above with respect to FIG. 7. For example, the display gate driver may provide scan control signals to scan lines 712 through control bus 750. The display source driver may send display data to active pixels 714 through data lines 740. In some embodiments, the display source driver and/or the display gate driver may perform gamma correction (e.g., apply display gamma to correct or offset image gamma) and provide drive currents or voltages to the light sources based on a transfer function between input display values (e.g., pixel data indicating gray levels or drive levels) and luminance levels.

Display panel 1630 may include scan lines and a two-dimensional array of active pixels that may include light sources (e.g., OLEDs or micro-LEDs) of different colors as described above with respect to, for example, FIG. 7. Each light source may be associated with a drive circuit, such as driving and compensation circuit 900. The drive circuit may receive and store image data (e.g., $V_{data}$) and provide a drive current based on the stored image data to the light source for light emission. The received and initially stored image data may include the leakage compensation components. The stored image data at each pixel may change over time due to the leakage described above, for example, with respect to FIG. 14, while image data for pixels in other rows is being loaded. After the image data for a frame is written into the corresponding pixels, the stored image data at each pixel may have a desired value as a result of the pre-compensation and the leakage. Thus, when all pixels are turned on to emit light, the drive current for each light source may be at a desire value to emit light with a desired luminance level to more precisely display the re-projected image generated by compositor 1614.

Figure 17:
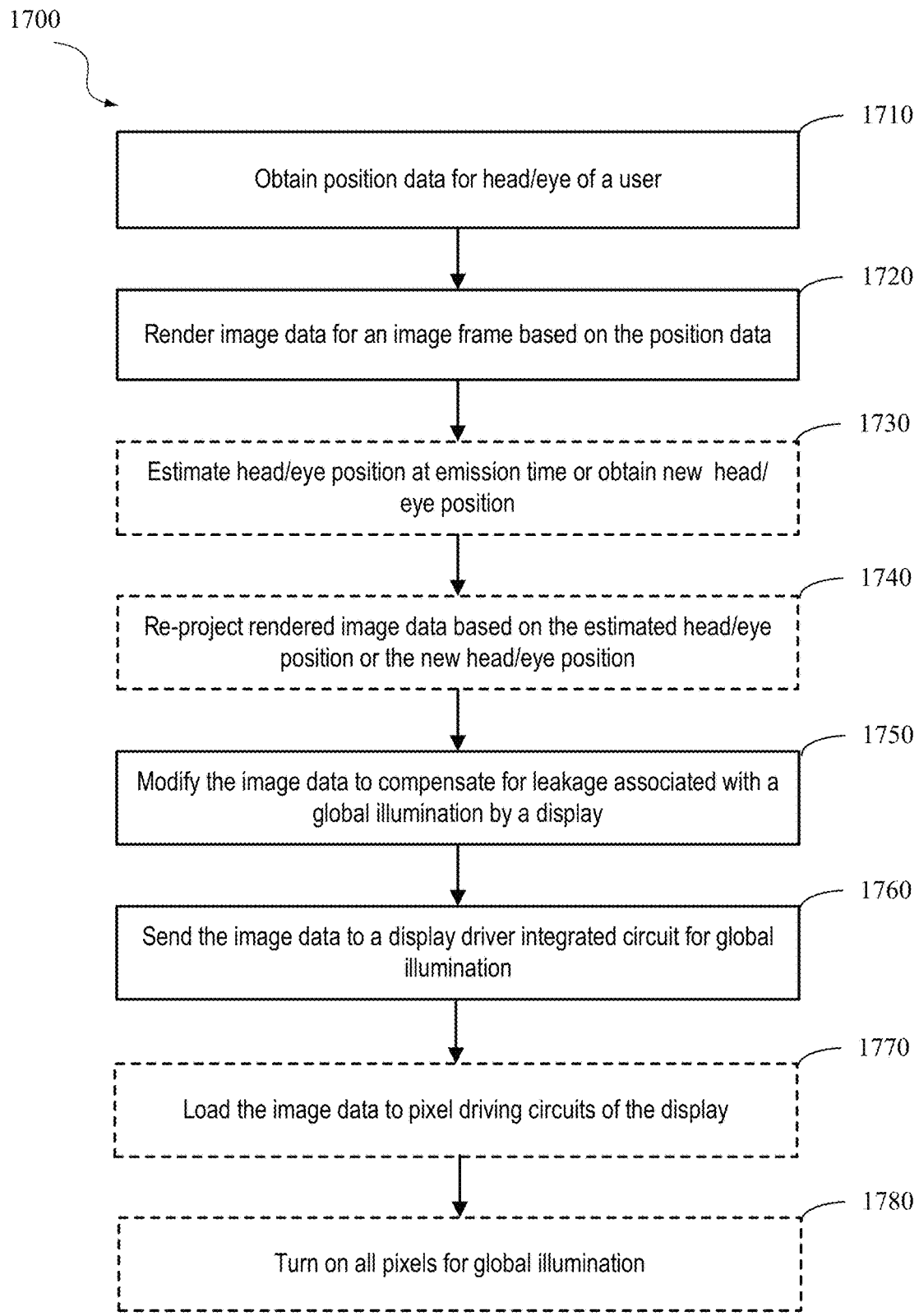
FIG. 17 illustrates an example of a method of displaying images using leakage compensation for global illumination in an artificial reality system according to certain embodiments.

FIG. 17 includes a flow chart 1700 illustrating an example of a method of displaying video frames using leakage-compensated global illumination in an artificial reality system according to certain embodiments. The operations described in flow chart 1700 are for illustration purposes only and are not intended to be limiting. In various implementations, modifications may be made to flow chart 1700 to add additional operations, omit some operations, merge some operations, or split an operation. The operations described in flow chart 1700 may be performed using, for example, near-eye display system 600, display system 700, display controller 1100, or display 1600.

At block 1710, an application processor, such as application processor 1120 or 1610, may obtain position data for at least one of a head or an eye of a user of a display system. The application processor may include one or more CPUs or one or more GPUS. The position data may be collected or generated by, for example, a head-tracking sensor or an eye-tracking sensor as described above with respect to, for example, FIG. 1. The position data may indicate the location and/or orientation of the user's head or eye.

At block 1720, the application processor may render image data for an image frame based on the position data. For example, the application processor may execute an application (e.g., a VR game) based on the position data to determine a scene for each eye of the user and convert the scene for the eye of the user to drawing commands to render the image data. The application processor may render the image data using, for example, rasterization, ray casting, or ray tracing techniques. In some embodiments, an estimated position of the head and/or eye of the user at a time of the global illumination may be predicted using, for example, a compositor, and the estimated position may then be used by the application processor to render the image data. The position of the head/eye of the user may be estimated based on, for example, a previously measured position, the speed of the movement, and the direction of the movement of the user's head/eye.

In some embodiments, at block 1730, the application processor may estimate the position of the user's head/eye at the time of the global illumination or may obtain a new position of the user's head/eye at a time after the image data is rendered. For example, the application processor may execute a compositor to estimate the position of the head/eye of the user at the global illumination time based on, for example, a previously measured position, the speed of the movement, and the direction of the movement of the user's head/eye. In some embodiments, the application processor may obtain the new position of the user's head/eye from a head-tracking sensor and/or an eye-tracking sensor after the image data is rendered.

In some embodiments, at block 1740, the application processor may re-project the image data based on the estimated position of the user's head/eye at the time of the global illumination or the new measured position of the user's head/eye after the image is rendered. Because of the global illumination, the estimated position or the new measured position may be common for all rows of pixels, and a same timewarping process (e.g., matrix multiplication) may be performed on the image data for all rows of pixels to re-project the image data for the image frame based on the common estimated or measured position.

At block 1750, the application processor may modify the image data to compensate for leakage associated with the global illumination by the display of the display system. For example, for each row of pixels of the display, the application processor may determine a leakage current in a driving circuit for a light source in a pixel of the row of pixels, determine a time delay between loading the image data for the row of pixels into the row of pixels and the global illumination, determine a leakage compensation value for the light source in the pixel based on the leakage current and the time delay, and adjust the image data for the light source of the pixel based on the leakage compensation value.

At block 1760, the application processor may send the image data to a display driver circuit (e.g., DDIC 720, 1150, or 1620) of the display system for displaying the image frame on the display through the global illumination. In some embodiments, the image data may be sent to a frame buffer of the display driver circuit.

At block 1770, the display driver circuit may load the image data to the pixel driving circuits (e.g., driving and compensation circuits 900) of the display. As described above, the image data may be loaded to the pixel driving circuits one row at a time using, for example, the control bus, data lines, and scan lines.

At block 1780, the display driver circuit may control the pixel driving circuits to turn on all pixels in the display for global illumination. For example, as described above, the display driver circuit may send a low-level light emitting control signal EM to all pixel driving circuits to turn on the light sources in the display for the global illumination.

Embodiments disclosed herein may be used to implement components of an artificial reality system or may be implemented in conjunction with an artificial reality system. Artificial reality is a form of reality that has been adjusted in some manner before presentation to a user, which may include, for example, a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

Figure 18:
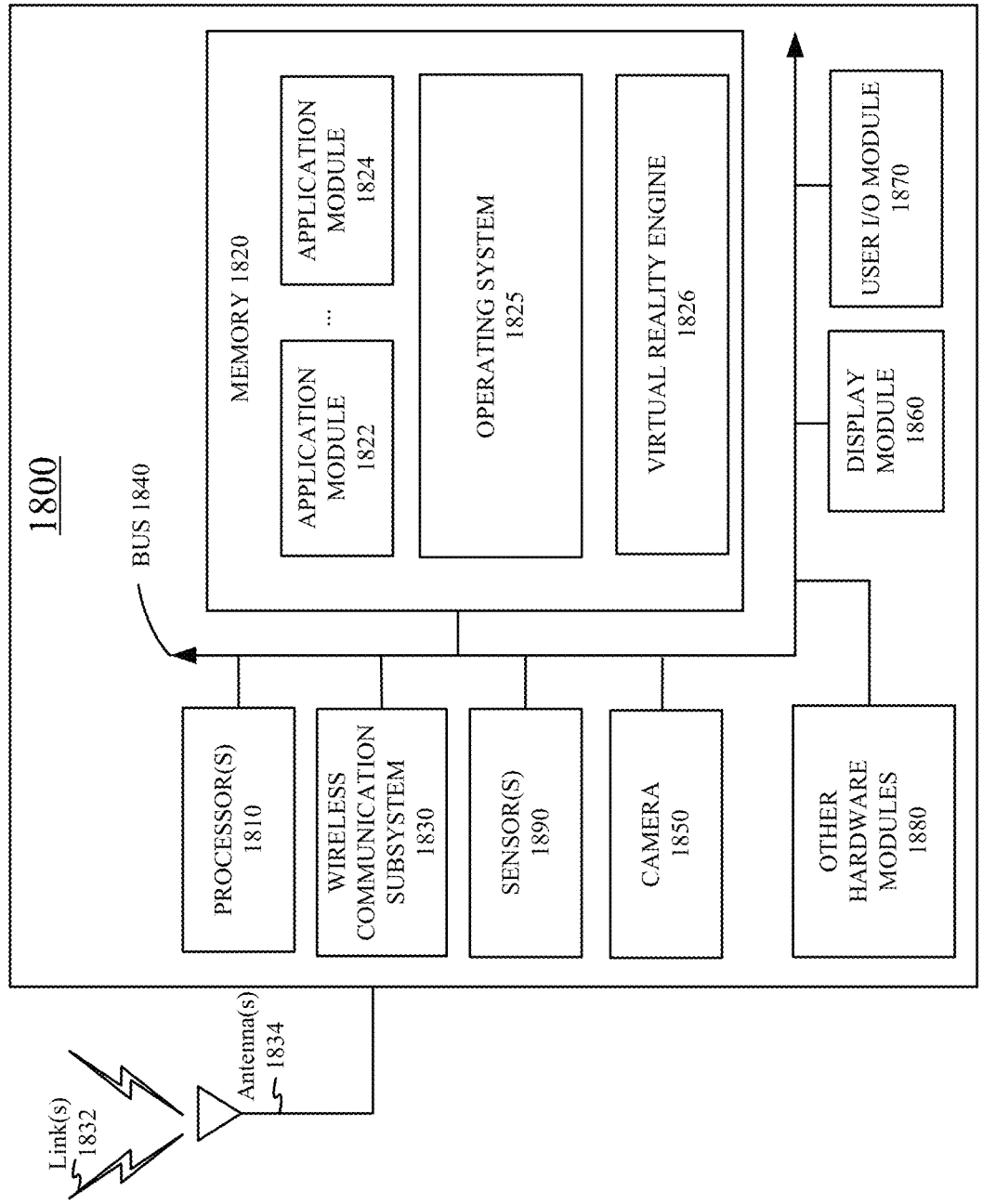
FIG. 18 is a simplified block diagram of an electronic system of an example of a near-eye display according to certain embodiments.

FIG. 18 is a simplified block diagram of an example electronic system 1800 of an example near-eye display (e.g., HMD device) for implementing some of the examples disclosed herein. Electronic system 1800 may be used as the electronic system of an HMD device or other near-eye displays described above. In this example, electronic system 1800 may include one or more processor(s) 1810 and a memory 1820. Processor(s) 1810 may be configured to execute instructions for performing operations at a plurality of components, and can be, for example, a general-purpose processor or microprocessor suitable for implementation within a portable electronic device. Processor(s) 1810 may be communicatively coupled with a plurality of components within electronic system 1800. To realize this communicative coupling, processor(s) 1810 may communicate with the other illustrated components across a bus 1840. Bus 1840 may be any subsystem adapted to transfer data within electronic system 1800. Bus 1840 may include a plurality of computer buses and additional circuitry to transfer data.

Memory 1820 may be coupled to processor(s) 1810. In some embodiments, memory 1820 may offer both short-term and long-term storage and may be divided into several units. Memory 1820 may be volatile, such as static random-access memory (SRAM) and/or dynamic random-access memory (DRAM) and/or non-volatile, such as read-only memory (ROM), flash memory, and the like. Furthermore, memory 1820 may include removable storage devices, such as secure digital (SD) cards. Memory 1820 may provide storage of computer-readable instructions, data structures, program modules, and other data for electronic system 1800. In some embodiments, memory 1820 may be distributed into different hardware modules. A set of instructions and/or code might be stored on memory 1820. The instructions might take the form of executable code that may be executable by electronic system 1800, and/or might take the form of source and/or installable code, which, upon compilation and/or installation on electronic system 1800 (e.g., using any of a variety of generally available compilers, installation programs, compression/decompression utilities, etc.), may take the form of executable code.

In some embodiments, memory 1820 may store a plurality of application modules 1822 through 1824, which may include any number of applications. Examples of applications may include gaming applications, conferencing applications, video playback applications, or other suitable applications. The applications may include a depth sensing function or eye tracking function. Application modules 1822-1824 may include particular instructions to be executed by processor(s) 1810. In some embodiments, certain applications or parts of application modules 1822-1824 may be executable by other hardware modules 1880. In certain embodiments, memory 1820 may additionally include secure memory, which may include additional security controls to prevent copying or other unauthorized access to secure information.

In some embodiments, memory 1820 may include an operating system 1825 loaded therein. Operating system 1825 may be operable to initiate the execution of the instructions provided by application modules 1822-1824 and/or manage other hardware modules 1880 as well as interfaces with a wireless communication subsystem 1830 which may include one or more wireless transceivers. Operating system 1825 may be adapted to perform other operations across the components of electronic system 1800 including threading, resource management, data storage control and other similar functionality.

Wireless communication subsystem 1830 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 1800 may include one or more antennas 1834 for wireless communication as part of wireless communication subsystem 1830 or as a separate component coupled to any portion of the system. Depending on desired functionality, wireless communication subsystem 1830 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1830 may permit data to be exchanged with a network, other computer systems, and/or any other devices described herein. Wireless communication subsystem 1830 may include a means for transmitting or receiving data, such as identifiers of HMD devices, position data, a geographic map, a heat map, photos, or videos, using antenna(s) 1834 and wireless link(s) 1832. Wireless communication subsystem 1830, processor(s) 1810, and memory 1820 may together comprise at least a part of one or more of a means for performing some functions disclosed herein.

Embodiments of electronic system 1800 may also include one or more sensors 1890. Sensor(s) 1890 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 1890 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or any combination thereof. The position sensors may be located external to the IMU, internal to the IMU, or any combination thereof. At least some sensors may use a structured light pattern for sensing.

Electronic system 1800 may include a display module 1860. Display module 1860 may be a near-eye display, and may graphically present information, such as images, videos, and various instructions, from electronic system 1800 to a user. Such information may be derived from one or more application modules 1822-1824, virtual reality engine 1826, one or more other hardware modules 1880, a combination thereof, or any other suitable means for resolving graphical content for the user (e.g., by operating system 1825). Display module 1860 may use LCD technology, LED technology (including, for example, OLED, ILED, μLED, AMO-LED, TOLED, etc.), light emitting polymer display (LPD) technology, or some other display technology.

Electronic system 1800 may include a user input/output module 1870. User input/output module 1870 may allow a user to send action requests to electronic system 1800. An action request may be a request to perform a particular action. For example, an action request may be to start or end an application or to perform a particular action within the application. User input/output module 1870 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1800. In some embodiments, user input/output module 1870 may provide haptic feedback to the user in accordance with instructions received from electronic system 1800. For example, the haptic feedback may be provided when an action request is received or has been performed.

Electronic system 1800 may include a camera 1850 that may be used to take photos or videos of a user, for example, for tracking the user's eye position. Camera 1850 may also be used to take photos or videos of the environment, for example, for VR, AR, or MR applications. Camera 1850 may include, for example, a complementary metal-oxide-semiconductor (CMOS) image sensor with a few millions or tens of millions of pixels. In some implementations, camera 1850 may include two or more cameras that may be used to capture 3-D images.

In some embodiments, electronic system 1800 may include a plurality of other hardware modules 1880. Each of other hardware modules 1880 may be a physical module within electronic system 1800. While each of other hardware modules 1880 may be permanently configured as a structure, some of other hardware modules 1880 may be temporarily configured to perform specific functions or temporarily activated. Examples of other hardware modules 1880 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 1880 may be implemented in software.

In some embodiments, memory 1820 of electronic system 1800 may also store a virtual reality engine 1826. Virtual reality engine 1826 may execute applications within electronic system 1800 and receive position information, acceleration information, velocity information, predicted future positions, or any combination thereof of the HMD device from the various sensors. In some embodiments, the information received by virtual reality engine 1826 may be used for producing a signal (e.g., display instructions) to display module 1860. For example, if the received information indicates that the user has looked to the left, virtual reality engine 1826 may generate content for the HMD device that mirrors the user's movement in a virtual environment. Additionally, virtual reality engine 1826 may perform an action within an application in response to an action request received from user input/output module 1870 and provide feedback to the user. The provided feedback may be visual, audible, or haptic feedback. In some implementations, processor(s) 1810 may include one or more GPUs that may execute virtual reality engine 1826.

In various implementations, the above-described hardware and modules may be implemented on a single device or on multiple devices that can communicate with one another using wired or wireless connections. For example, in some implementations, some components or modules, such as GPUs, virtual reality engine 1826, and applications (e.g., tracking application), may be implemented on a console separate from the head-mounted display device. In some implementations, one console may be connected to or support more than one HMD.

In alternative configurations, different and/or additional components may be included in electronic system 1800. Similarly, functionality of one or more of the components can be distributed among the components in a manner different from the manner described above. For example, in some embodiments, electronic system 1800 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
obtaining, by an application processor, position data for at least one of a head or an eye of a user of a display system;
rendering, by the application processor based on the position data, image data for an image frame;
modifying pixel values for each row of pixels of the image data for the image frame based on a time delay between a loading time of the row of pixels of the image data for the image frame and a time of a global illumination of the image frame, and using a pre-determined leakage current of a transistor of a driving circuit for a pixel in the row of pixels to compensate for leakage associated with the global illumination of the image frame by a display of the display system, wherein the pre-determined leakage current is a predicted leakage current between a drain and a source of the transistor of the driving circuit determined according to a voltage on a gate of the transistor and a voltage between the source and the drain of the transistor; and
sending the image data to a display driver circuit of the display system for displaying the image frame on the display through the global illumination.

2. The method of claim 1, further comprising, before modifying the image data, re-projecting, based on updated position data, the image data rendered by the application processor.

3. The method of claim 1, further comprising, before modifying the image data:
estimating a position of at least one of the head or the eye of the user at the time of the global illumination; and
re-projecting, based on the estimated position of at least one of the head or the eye of the user, the image data rendered by the application processor.

4. The method of claim 1, further comprising, before modifying the image data:
obtaining a new position of at least one of the head or the eye of the user at a time after the image data is rendered; and
re-projecting, based on the new position of at least one of the head or the eye of the user, the image data rendered by the application processor.

5. The method of claim 1, further comprising:
estimating, based on the position data, a position of at least one of the head or the eye of the user at the time of the global illumination,
wherein rendering the image data by the application processor comprises rendering the image data based on the estimated position of at least one of the head or the eye of the user at the time of the global illumination.

6. The method of claim 1, further comprising:
loading the image data into pixel driving circuits of the display system; and
turning on, by the display driver circuit, pixels of the display system for the global illumination.

7. The method of claim 1, wherein obtaining the position data for at least one of the head or the eye of the user includes receiving the position data from at least one of a head-tracking sensor or an eye-tracking sensor.

8. The method of claim 1, wherein rendering the image data for the image frame comprises:
executing an application based on the position data to determine a scene for the eye of the user; and
converting the scene for the eye of the user to drawing commands.

9. A display system comprising:
a display including a plurality of light sources and corresponding light source driving circuits, the plurality of light sources arranged in a plurality of rows;
a display driver circuit coupled to the display; and
an application processor coupled to the display driver circuit and configured to:
obtain position data for at least one of a head or an eye of a user of the display system;
render, based on the position data, image data for an image frame;
modify pixel values for each row of pixels of the image data for the image frame based on a time delay between a loading time of the row of pixels of the image data for the image frame and a time of a global illumination of the image frame, and using a pre-determined leakage current of a transistor of a driving circuit for a pixel in the row of, to compensate for leakage associated with the global illumination of the image frame by the display, wherein the pre-determined leakage current is a predicted leakage current between a drain and a source of the transistor of the driving circuit determined according to a voltage on a gate of the transistor and a voltage between the source and the drain of the transistor; and
send the image data to the display driver circuit for displaying the image frame on the display through the global illumination.

10. The display system of claim 9, wherein the application processor is further configured to, before modifying the image data, re-project the image data based on updated position data.

11. The display system of claim 9, wherein the application processor is further configured to, before modifying the image data:
estimate a position of at least one of the head or the eye of the user at the time of the global illumination; and
re-project the image data based on the estimated position of at least one of the head or the eye of the user.

12. The display system of claim 9, wherein the application processor is further configured to, before modifying the image data:
obtain a new position of at least one of the head or the eye of the user at a time after the image data is rendered; and
re-project the image data based on the new position of at least one of the head or the eye of the user.

13. The display system of claim 9, wherein the application processor is configured to:
estimate, based on the position data, a position of at least one of the head or the eye of the user at the time of the global illumination; and
render the image data based on the estimated position of at least one of the head or the eye of the user.

14. The display system of claim 9, wherein the application processor is configured to render the image data for the image frame by:
   executing an application based on the position data to determine a scene for the eye of the user; and
   converting the scene for the eye of the user to drawing commands.

15. The display system of claim 9, wherein the display driver circuit is configured to:
   load the image data into the corresponding light source driving circuits for the plurality of light sources; and
   control the corresponding light source driving circuits to turn on the plurality of light sources for the global illumination.

16. The display system of claim 9, wherein the application processor includes at least one of a central processing unit or a graphic processing unit.

17. The display system of claim 9, wherein the plurality of light sources includes an array of organic light emitting diodes (OLEDs) or an array of micro-light emitting diodes (micro-LEDs).

18. A non-transitory machine-readable storage medium including instructions stored thereon, the instructions, when executed by one or more processors, cause the one or more processors to perform operations including:
   obtaining position data for at least one of a head or an eye of a user of a display system;
   rendering, based on the position data, image data for an image frame;
   modifying pixel values for each row of pixels of the image data for the image frame based on a time delay between a loading time of the row of pixels of the image data for the image frame and a time of a global illumination of the image frame, and using a pre-determined leakage current of a transistor of a driving circuit for a pixel in the row of pixels, to compensate for leakage associated with the global illumination of the image frame by a display of the display system, wherein the pre-determined leakage current is a predicted leakage current between a drain and a source of the transistor of the driving circuit determined according to a voltage on a gate of the transistor and a voltage between the source and the drain of the transistor; and
   sending the image data to a display driver circuit of the display system for displaying the image frame on the display through the global illumination.

* * * * *